(12) United States Patent
Shimoshikiryou et al.

(10) Patent No.: US 6,717,645 B2
(45) Date of Patent: Apr. 6, 2004

(54) LCD WITH ELECTRODES(S) FOR PRODUCING TRANSVERSE ELECTRIC FIELD COMPONENT

(75) Inventors: Fumikazu Shimoshikiryou, Taki-gun (JP); Keizo Watanabe, Taki-gun (JP); Keisuke Yoshida, Yamatokoorlyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 14 days.

(21) Appl. No.: 09/949,838

(22) Filed: Sep. 12, 2001

(65) Prior Publication Data

US 2002/0033923 A1 Mar. 21, 2002

(30) Foreign Application Priority Data

Sep. 12, 2000 (JP) .......................... 2000-276359

(51) Int. Cl.⁷ ..................... G02F 1/1343; G02F 1/1335; G02F 1/1337; G09G 3/36
(52) U.S. Cl. .................. 349/141; 349/96; 349/132; 349/117; 345/87
(58) Field of Search ............... 349/96, 85, 117, 349/119, 123, 129, 132, 141, 170; 345/87

(56) References Cited

U.S. PATENT DOCUMENTS

| 5,745,204 A | * | 4/1998 | Hoshino | 349/117 |
| 6,005,650 A | * | 12/1999 | Kim et al. | 349/130 |
| 6,067,141 A | * | 5/2000 | Yamada et al. | 349/129 |
| 6,259,503 B1 | * | 7/2001 | Watanabe et al. | 349/141 |
| 2001/0038369 A1 | * | 11/2001 | Adachi et al. | 345/87 |
| 2002/0036740 A1 | * | 3/2002 | Kubo et al. | 349/129 |

FOREIGN PATENT DOCUMENTS

| JP | 06-194656 | 7/1994 |
| JP | 07-043719 | 2/1995 |
| JP | 07-110480 | 4/1995 |
| JP | 09-022025 | 1/1997 |
| JP | 10-03081 | 1/1998 |
| JP | 11-202323 | 7/1999 |

* cited by examiner

*Primary Examiner*—Tarifur R. Chowdury
(74) *Attorney, Agent, or Firm*—Nixon Vanderhye P.C.

(57) ABSTRACT

The liquid crystal display device of the present invention includes a liquid crystal cell having a liquid crystal layer including liquid crystal molecules having a positive dielectric anisotropy, and a pair of polarizers and at least one phase difference compensator that are provided outside the liquid crystal cell. The liquid crystal display device of the present invention displays an image in a normally black mode. A pair of electrodes provided so as to interpose the liquid crystal layer therebetween produce a transverse electric field component parallel to the plane of the liquid crystal layer in the presence of an applied voltage, and the orientation axis direction, which is defined by the azimuth angle of the orientation direction of the liquid crystal molecules near the center of the liquid crystal layer in the thickness direction thereof, is changed by the transverse electric field component.

15 Claims, 36 Drawing Sheets

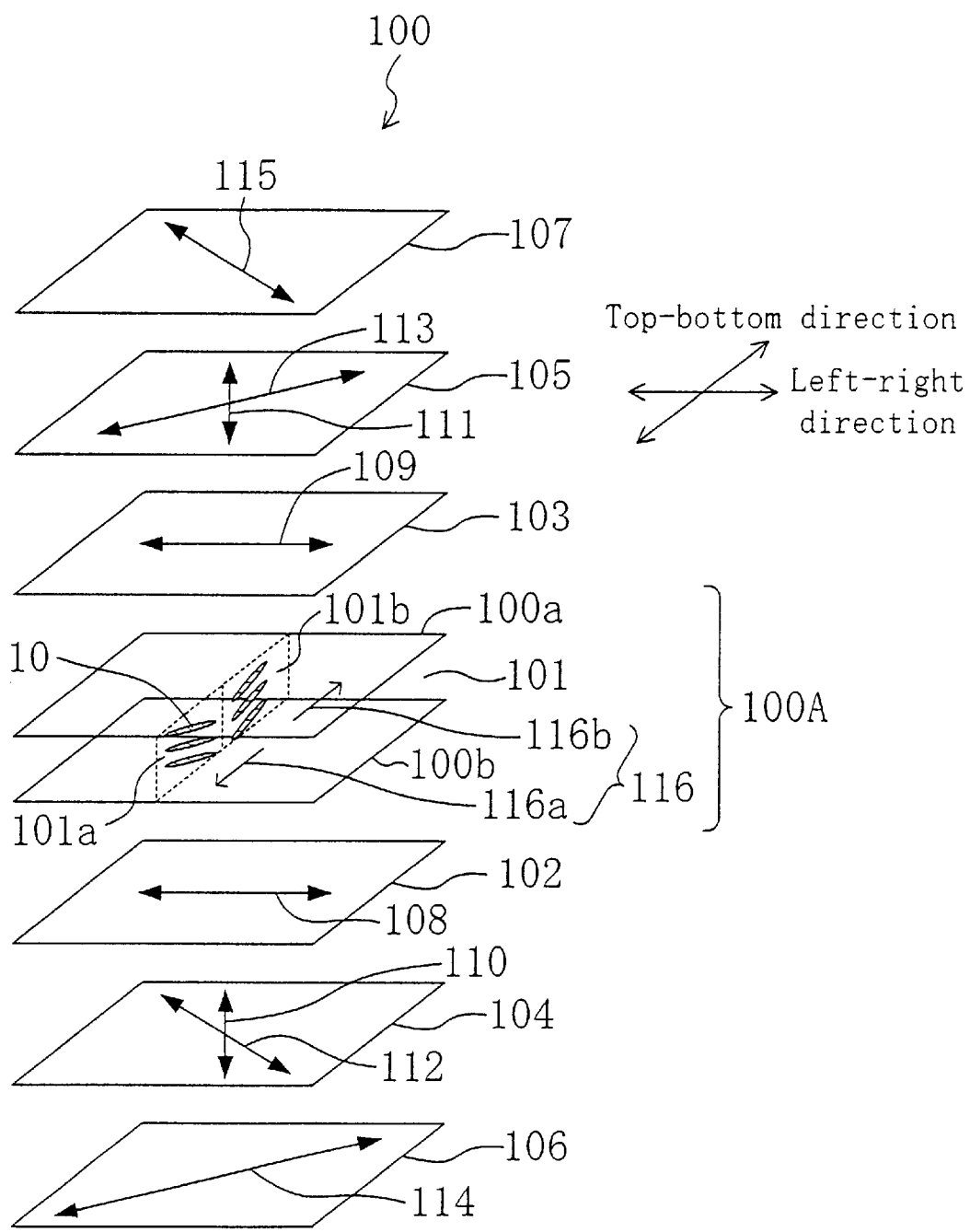

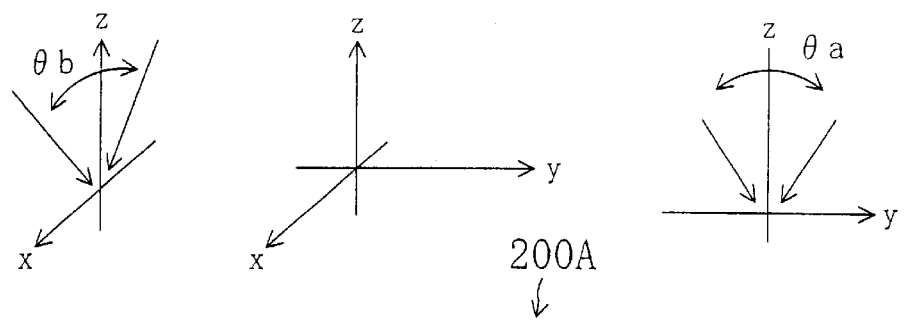
FIG. 2A
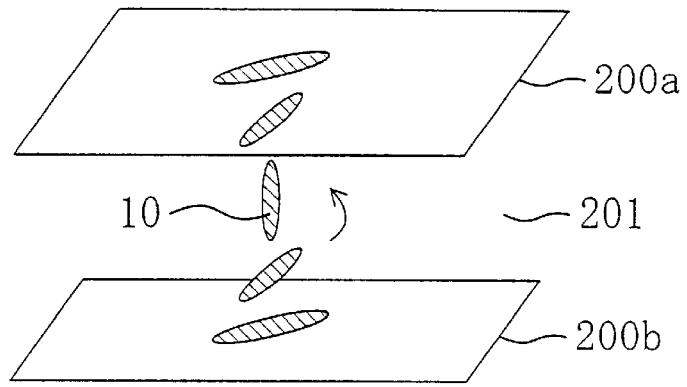
FIG. 2B
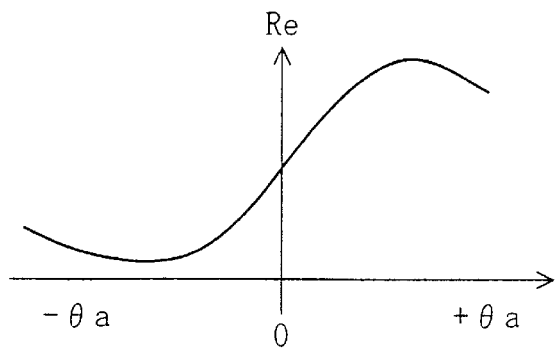
FIG. 2C
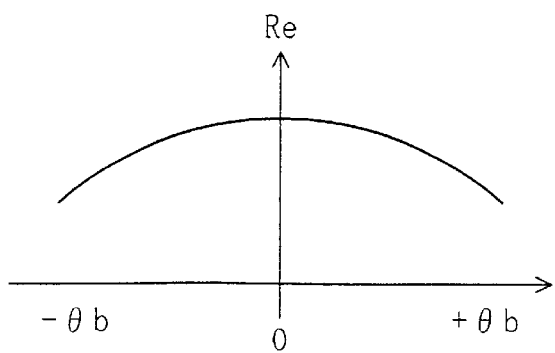

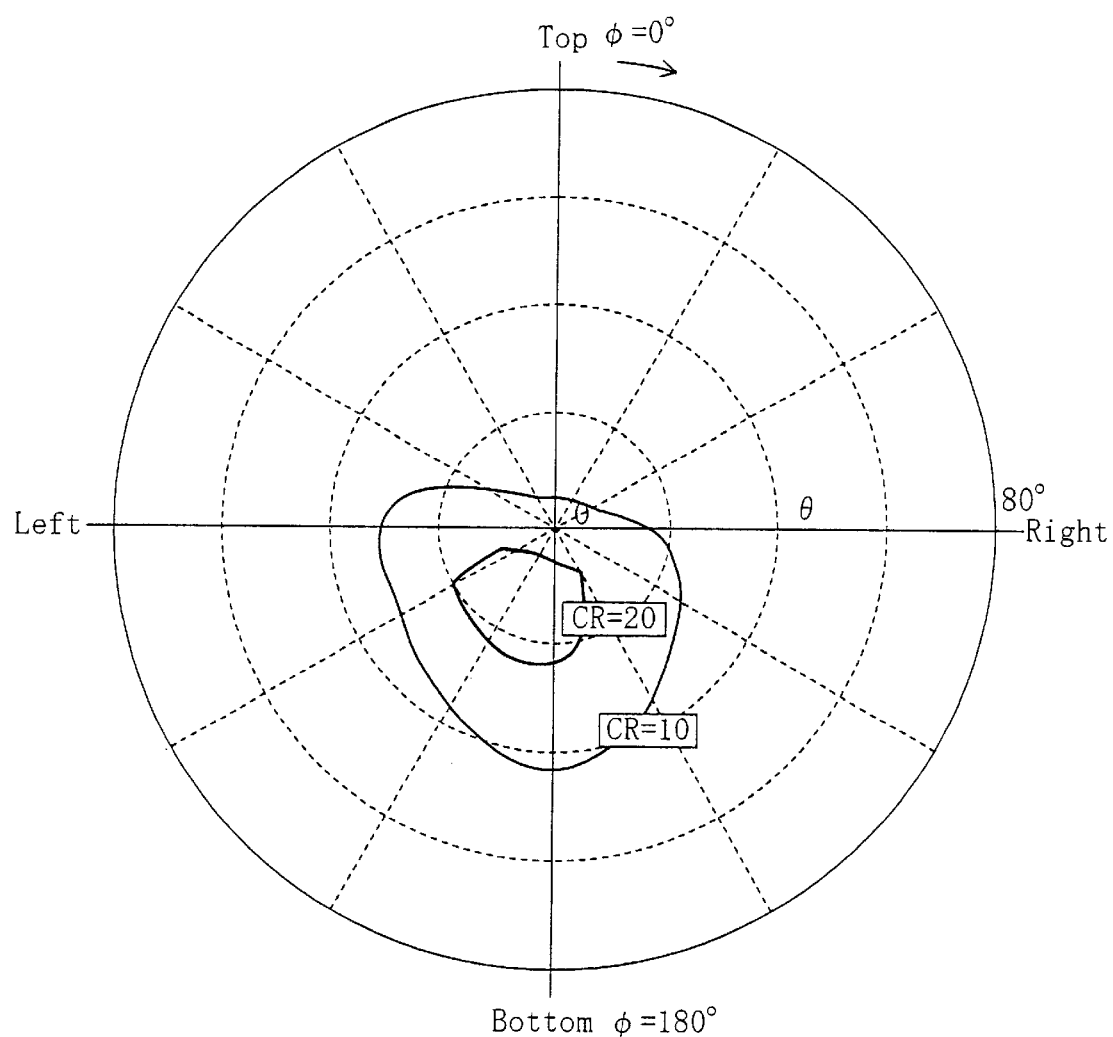

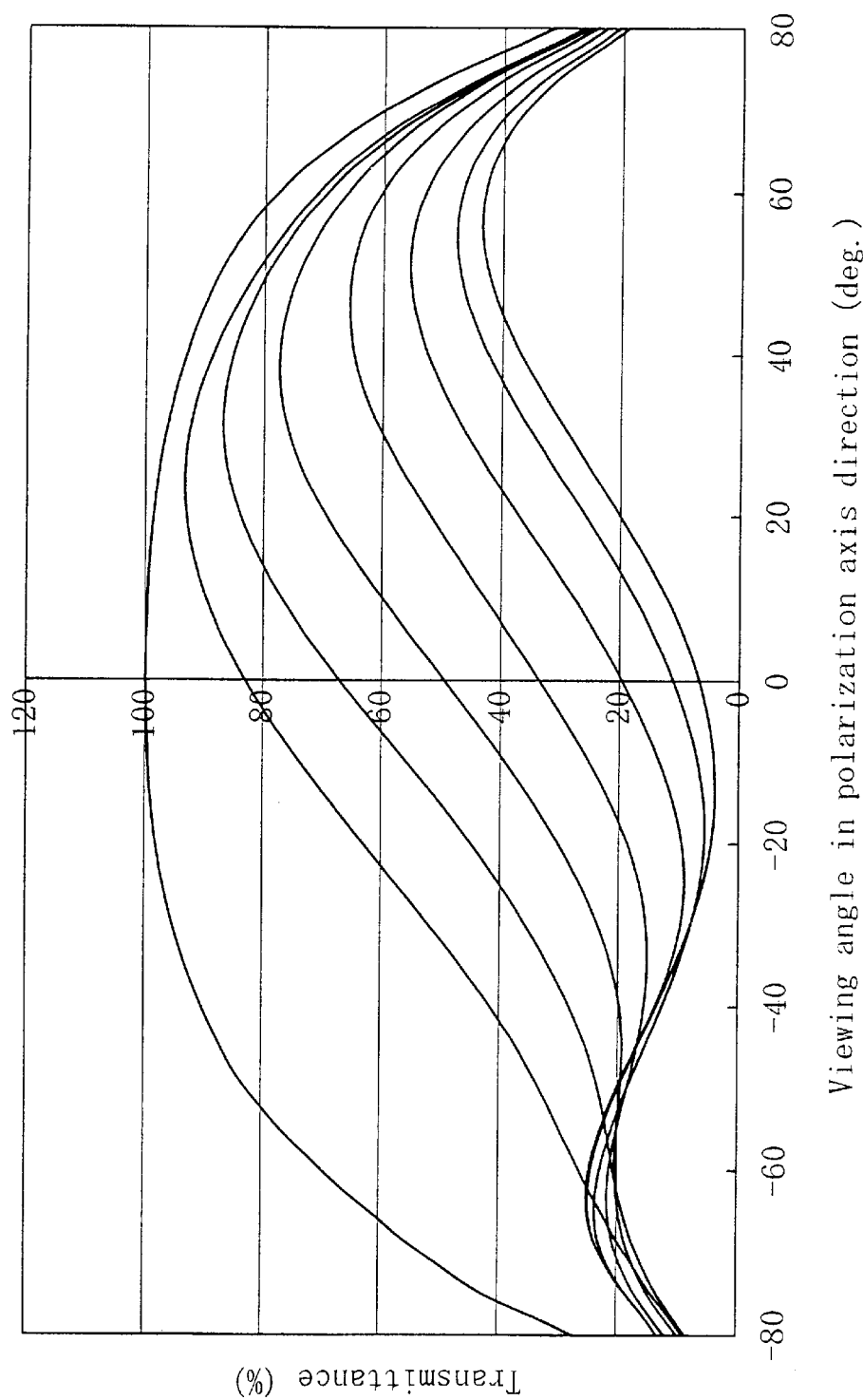

LCD WITH ELECTRODES(S) FOR PRODUCING TRANSVERSE ELECTRIC FIELD COMPONENT

BACKGROUND OF THE INVENTION

1. Field of the Invention

The present invention relates to a liquid crystal display device, and more particularly to a liquid crystal display device having a horizontal orientation liquid crystal layer.

2. Description of the Prior Art

A liquid crystal display device (also referred to by the abbreviation "LCD") is a flat panel display device having desirable characteristics such as a small thickness, a small weight, and a small power consumption. However, TN (Twisted Nematic) type LCDs, which are widely used in the art, have a problem in that the display quality varies depending on the direction from which they are observed (viewing angle), i.e., have poor viewing angle characteristics. Particularly, the display characteristics vary significantly when the viewing angle is changed in the orientation axis direction defined by the azimuth direction of the orientation direction of liquid crystal molecules (the direction of the long axis of the liquid crystal molecules in the plane of the liquid crystal layer) that are near the center of the liquid crystal cell in the thickness direction thereof (also referred to as "the orientation axis direction of the intermediate layer of the liquid crystal cell"). Specifically, when the angle at which the LCD is observed is changed in the orientation axis direction of the intermediate layer of the liquid crystal cell, the display characteristics (e.g., the contrast ratio) become asymmetric about the normal direction (the direction normal to the display plane). Moreover, in an intermediate gray level display, there occurs a display brightness (gray level) inversion phenomenon. In an intermediate gray level display, when the viewing angle direction is inclined from the direction normal to the display plane (viewing angle è=0°) toward one direction (e.g., upwardly) in the orientation axis direction of the intermediate layer of the liquid crystal cell (i.e., when the viewing angle è is increased from 0°), the display brightness once increases and then decreases after a certain angle. When the viewing angle direction is inclined toward the opposite direction (e.g., downwardly) in the orientation axis direction of the intermediate layer of the liquid crystal cell, the display brightness once decreases and then increases after a certain angle.

Various techniques have been developed in the art to improve the viewing angle characteristics of the TN type LCD. For example, Japanese Laid-Open Patent Publication No. 7-43719 discloses a liquid crystal display device having electrooptical characteristics of a normally white mode, in which at least one of a pair of electrodes for applying an electric field across the liquid crystal layer is provided with slits whose long side is parallel to the average orientation direction of the liquid crystal molecules being projected onto the substrate (substantially the same as the orientation axis direction of the intermediate layer of the liquid crystal cell). With this configuration, an inclined electric field is produced in the liquid crystal layer in each pixel. As a result, a plurality of regions where liquid crystal molecules rise in respectively different directions are formed in each pixel, thereby improving the viewing angle characteristics.

However, according to a study conducted by the present inventors, although the technique disclosed in Japanese Laid-Open Patent Publication No. 7-43719 is effective in reducing the change in the brightness occurring as the viewing angle is changed in the orientation axis direction of the intermediate layer of the liquid crystal cell, it falls short of solving the asymmetry of the display characteristics about the normal direction and the inversion phenomenon. Moreover, with this technique, the display contrast ratio as viewed from the normal direction is lower than that of other conventional TN type LCDs.

SUMMARY OF THE INVENTION

An object of the present invention is to provide a liquid crystal display device having desirable viewing angle characteristics.

The object is achieved by a liquid crystal display device as set forth below. A liquid crystal display device of the present invention is a liquid crystal display device having a normally black mode electrooptical characteristics and including: a liquid crystal cell having a pair of substrates, a horizontal orientation liquid crystal layer provided between the pair of substrates and including liquid crystal molecules having a positive dielectric anisotropy, and a plurality of pixels each being defined by a pair of electrodes opposing each other via the liquid crystal layer therebetween; and a pair of polarizers and at least one phase difference compensator provided outside the liquid crystal cell, wherein: the pair of polarizers and the at least one phase difference compensator are arranged so that the transmittance is lower in the absence of an electric field applied across the liquid crystal layer than in the presence of an electric field applied across the liquid crystal layer; and the pair of electrodes produce a transverse electric field component parallel to the plane of the liquid crystal layer in the presence of an applied voltage therebetween, and an orientation axis direction, which is defined by the azimuth angle of the orientation direction of liquid crystal molecules near the center of the liquid crystal layer in the thickness direction thereof, is changed by the transverse electric field component.

The liquid crystal display device of the present invention has desirable viewing angle characteristics. Since the liquid crystal display device of the present invention uses a horizontal orientation liquid crystal layer, there is provided a wide variety of materials to choose from, and the liquid crystal display device can be manufactured by using a reliable material. Moreover, since the transverse electric field component for improving the viewing angle dependence of the brightness can be produced only by providing an opening in a conventional electrode, the liquid crystal display device can be easily manufactured by using a conventional manufacturing method.

The pair of polarizers may be arranged so that polarization axes thereof are orthogonal to each other.

The liquid crystal layer may be a homogenous alignment type liquid crystal layer. Preferably, the azimuth angle direction of the orientation direction of the liquid crystal molecules of the liquid crystal layer in the presence of an applied voltage varies depending on the position in the thickness direction of the liquid crystal layer.

Preferably, the liquid crystal layer includes, in each of the plurality of pixels, a plurality of domains whose orientation axis directions differ from one other.

Preferably, the plurality of domains include domains whose orientation axis directions differ from each other by 180°.

Preferably, the pair of electrodes produce transverse electric field components of different directions in the presence of an applied voltage. More preferably, the transverse electric field components of different directions include transverse electric field components of directions differing from each other by 180°.

Preferably, the liquid crystal layer includes, in each of the plurality of pixels, a plurality of regions whose orientation axis directions change in different directions in the presence of an applied voltage, and the plurality of regions have an equal area and are arranged symmetrically.

Preferably, the direction of the transverse electric field component produced by the pair of electrodes is at an angle of 60° to 90° with respect to the orientation axis direction of the liquid crystal layer in the absence of an applied voltage.

At least one of the pair of electrodes may be a conductive layer including openings therein, thereby producing the transverse electric field component.

Preferably, the liquid crystal display device further includes another phase difference compensator for compensating for the retardation of the liquid crystal layer in the absence of an applied voltage for light incident from a direction inclined from the direction normal to the plane of the liquid crystal layer. The above-described object and other objects of the present invention will become more apparent by reading the following detailed description with reference to the accompanying drawings.

BRIEF DESCRIPTION OF THE DRAWINGS

FIG. 1 is a schematic diagram illustrating a first configuration of an LCD 100 according to the present invention;

FIG. 2A is a diagram schematically illustrating a liquid crystal cell 200A having a pixel having an undivided orientation (homogenous type alignment; in the presence of an applied voltage), FIG. 2B is a diagram illustrating how the retardation changes as the viewing angle is changed in the top-bottom direction of the pixel, and FIG. 2C is a diagram illustrating how the retardation changes as the viewing angle is changed in the left-right direction of the pixel;

FIG. 10B and FIG. 10C are diagrams each schematically illustrating a distribution of the potential produced by the pair of electrodes, wherein FIG. 10B illustrates a potential distribution along an arbitrary axis parallel to the x axis (or the y axis) in an arbitrary plane parallel to the plane of the liquid crystal layer, and FIG. 10C illustrates a potential distribution in the direction normal to the plane of the liquid crystal layer (the thickness direction or the z axis direction);

FIG. 11A to FIG. 11D are diagrams illustrating an embodiment of a liquid crystal display device having the second configuration of the present invention, wherein FIG. 11A is a diagram schematically illustrating a liquid crystal cell 100A having slit-shaped openings, and FIG. 11B, FIG. 11C and FIG. 11D are diagrams each schematically illustrating a potential distribution in a liquid crystal layer 1101 of the liquid crystal cell 1100A;

FIG. 24B shows iso-contrast curves (viewing angle characteristics) of the LCD of Comparative Example 2; FIG. 25C is a graph illustrating a viewing angle dependence of the brightness in the polarization axis direction of the LCD of Comparative Example 2.

DETAILED DESCRIPTION OF THE PREFERRED EMBODIMENT

Figure 3A:
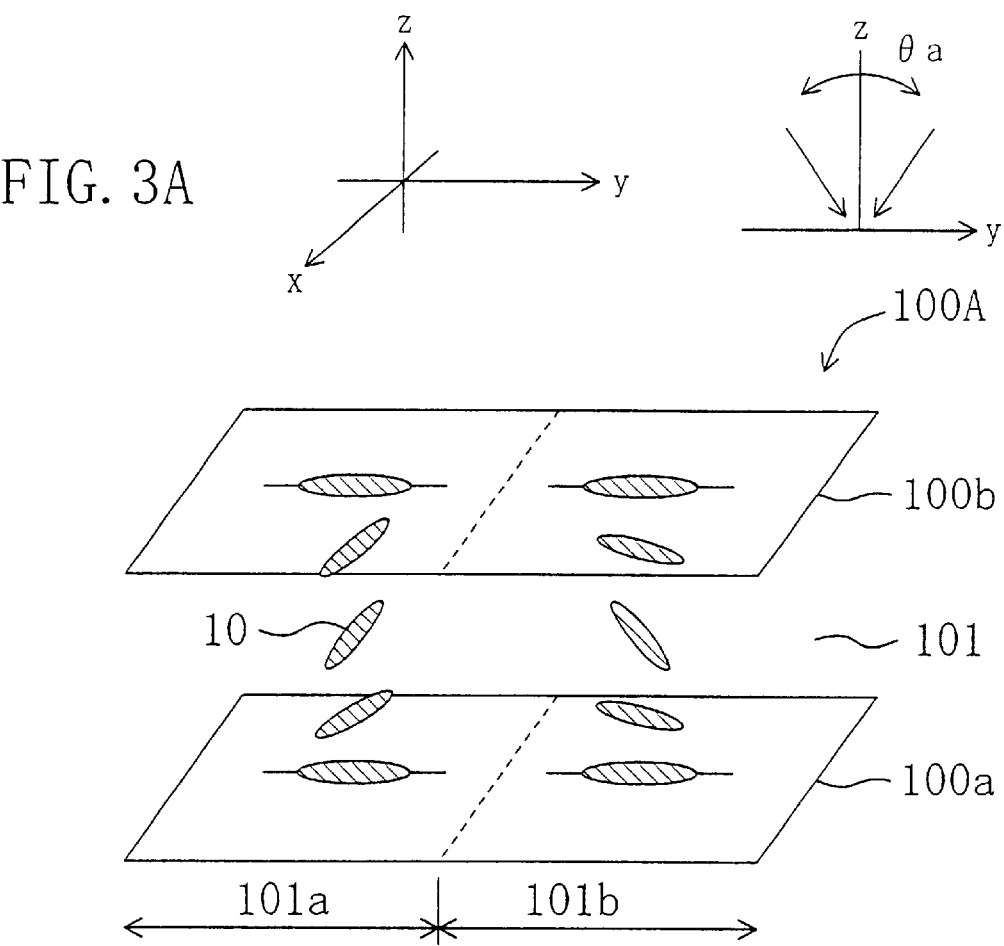
FIG. 3A is a diagram schematically illustrating a liquid crystal cell 100A having a pixel having a two-divided orientation (homogenous type alignment; in the presence of an applied voltage)

The configuration and the operating principle of a liquid crystal display device according to an embodiment of the present invention will be described.

A liquid crystal display device of the present invention includes a liquid crystal cell having a liquid crystal layer provided between a pair of substrates. The liquid crystal layer is a horizontal orientation liquid crystal layer including liquid crystal molecules having a positive dielectric anisotropy. A horizontal orientation liquid crystal layer refers to a liquid crystal layer in which the liquid crystal molecules are aligned so that the long axis thereof is generally parallel (with small pretilt angles) to the substrate plane (typically provided with an alignment film) in the absence of an applied voltage. Specifically, this type of liquid crystal layer includes a TN alignment liquid crystal layer, and a homogenous alignment type liquid crystal layer in which an alignment film is subjected to an antiparallel rubbing process. In response to an electric field applied by a pair of electrodes provided so as to oppose each other via the liquid crystal layer therebetween, the orientation direction of the liquid crystal molecules of the liquid crystal layer changes, thereby modulating light passing through the liquid crystal layer (changing the polarization of the light). The pair of electrodes define pixels of the liquid crystal cell. Herein, a region of a liquid crystal cell corresponding to a "pixel", which is the minimum unit of display, will also be referred to as a "pixel" for the sake of simplicity. For example, each pixel is defined by a pixel electrode and a counter electrode opposing the pixel electrode in an active matrix type LCD, and by an intersection between one of column electrodes (signal electrodes) and one of row electrodes (scanning electrodes), which are both arranged in a stripe pattern, in a passive matrix type LCD.

A pair of polarizers and at least one phase difference compensator provided outside the liquid crystal cell are arranged so that the transmittance is lower in the absence of an electric field applied across the liquid crystal layer than in the presence of an electric field applied across the liquid crystal layer. For example, the polarizers are arranged via the liquid crystal cell therebetween so that the polarization axes thereof are orthogonal to each other. A liquid crystal display device of the present invention displays an image in a so-called "normally black mode" (hereinafter referred to as "NB mode"). As will be described later in detail, in a configuration where an image is displayed in the NB mode by using a horizontal orientation liquid crystal layer having a positive dielectric anisotropy, the retardation in a black display can be effectively compensated for over a wide viewing angle by using an phase difference compensator. Thus, a desirable black display can be realized over a wide viewing angle.

The above-described configuration capable of improving the viewing angle dependence of a black display in the NB mode will be referred to as the "first configuration".

However, employing the first configuration alone, there remains a problem that the brightness depends on the viewing angle direction in the presence of an applied voltage (particularly in an intermediate gray level display). The pair of electrodes of the liquid crystal display device of the present invention are configured so as to produce a transverse electric field component parallel to the plane of the liquid crystal layer in the presence of an applied voltage therebetween, so that the orientation axis direction, which is defined by the azimuth angle of the orientation direction of the liquid crystal molecules near the center of the liquid crystal layer in the thickness direction thereof, is changed by the transverse electric field component. In other words, in the presence of an applied voltage (particularly in an intermediate gray level display), the orientation axis direction of the liquid crystal molecules is changed by a transverse electric field component according to the voltage. For example, the azimuth angle direction of the orientation direction of each liquid crystal molecule of the liquid crystal layer varies depending on the position thereof in the thickness direction of the liquid crystal layer. Therefore, the optical anisotropy of the liquid crystal layer in each region where the orientation axis direction of the liquid crystal molecules is changed by the transverse electric field component is averaged, thereby reducing the viewing angle dependence of the brightness. The effect of reducing the optical anisotropy of the liquid crystal layer, by the transverse electric field component, is provided only in the presence of an applied voltage, and not in the absence of an applied voltage. Therefore, the effect does not deteriorate the high display quality of a black display in the NB mode realized by the first configuration. The configuration for producing a transverse electric field component that changes the orientation axis direction, which is defined by the azimuth angle of the orientation direction of the liquid crystal molecules near the center of the liquid crystal layer in the thickness direction thereof, will be referred to as the "second configuration".

Of course, the viewing angle characteristics can be further improved by employing a so-called "multi-domain structure", where the liquid crystal layer has a plurality of domains having different orientation axis directions in each of a plurality of pixels. In order to average the viewing angle dependence of the display quality, the plurality of domains preferably include domains whose orientation axis directions differ from each other by 180°. Particularly, it is preferred that domains whose orientation axis directions differ from each other by 180° are arranged so as to oppose each other. With such an arrangement, it is easy to compensate for the retardation in a black display, as will be described later.

It should be noted that according to the present invention, a plurality of regions where the orientation axis directions of the liquid crystal molecules differ from one another can be formed by a transverse electric field component, without forming a multi-domain structure by using a rubbing process, an optical alignment process, or the like, as in the prior art. In other words, a liquid crystal layer having a mono-domain structure in the absence of an applied voltage can be turned into a multi-domain structure by applying a voltage thereacross.

For example, such a configuration can be realized by configuring the pair of electrodes so as to produce a plurality of transverse electric field components of different directions in the presence of an applied voltage therebetween. In order to average the viewing angle dependence of the display quality, the plurality of transverse electric field components of different directions preferably include transverse electric field components whose directions differ from each other by 180°. Moreover, the viewing angle characteristics can be further averaged by employing a configuration in which the liquid crystal layer has, in each of a plurality of pixels, a plurality of regions whose orientation axis directions change in different directions in the presence of an applied voltage, wherein the plurality of regions have an equal area and are arranged symmetrically. It is preferred that the direction of the transverse electric field component produced by the pair of electrodes is at an angle of 60° to 90° with respect to the orientation axis direction of the liquid crystal layer in the absence of an applied voltage, whereby the orientation of the liquid crystal molecules changes continuously and symmetrically.

The production of a transverse electric field component that changes the orientation axis direction of the liquid crystal molecules according to the voltage applied between the pair of electrodes can be realized by, for example, using a conductive layer having openings therein as one of the pair of electrodes. Each of such openings typically has a slit shape (elongate rectangular shape). By using a conductive layer having slit-shaped openings therein as the electrode, the transverse electric field component as described above is produced, whereby it is possible to realize a liquid crystal display device in which the viewing angle dependence of the brightness is improved. By providing a plurality of slit-shaped openings and variously changing the arrangement of the openings, it is possible to control the viewing angle dependence. Transverse electric field components whose directions differ from each other by 180° are produced respectively near the opposing long sides of each slit-shaped opening. The other electrode opposing the electrode having slit-shaped openings therein may be a solid electrode (a flat electrode with no special structural features). Thus, a liquid crystal display device of the present invention can be obtained only by providing openings in one of a pair of electrodes, and the liquid crystal display device can be easily manufactured by using a manufacturing method known in the art. Of course, openings may alternatively be provided in each of the pair of opposing electrodes.

While a liquid crystal display device of the present invention has desirable viewing angle characteristics as described above, the viewing angle characteristics can be further improved by providing an additional phase difference compensator for compensating for the retardation with respect to light incident from a direction inclined from the direction normal to the plane of the liquid crystal layer in the absence of an applied voltage.

The structure and the operation of each embodiment of the liquid crystal display device of the present invention will now be described in detail with reference to the drawings.

First Configuration

First, the configuration capable of improving the viewing angle dependence of a black display in the NB mode (the first configuration) will be described.

The first configuration used in a liquid crystal display device (LCD) 100 of the present invention will be described with reference to FIG. 1. The configuration for producing a transverse electric field (the second configuration) used in the LCD 100 of the present invention will be described later. FIG. 1 schematically illustrates a configuration of a single pixel of the LCD 100.

The LCD 100 includes a liquid crystal layer 101, a pair of electrodes 100*a* and 100*b* for applying an electric field across the liquid crystal layer 101, a pair of phase difference compensators 102 and 103 provided respectively on both sides of the liquid crystal layer 101, further phase difference compensators 104 and 105 provided on the outer side of the phase difference compensators 102 and 103, respectively, and a pair of polarizers 106 and 107 arranged in a crossed Nicols state interposing the aforementioned elements therebetween.

Note that the liquid crystal layer 101 is provided between a pair of substrates (not shown), and the electrodes 100*a* and 100*b* are provided on one side of the pair of substrates, respectively, that is closer to the liquid crystal layer 101. The structure whose profile is defined by the pair of substrates is referred to as a "liquid crystal cell 100A". Moreover, as the liquid crystal layer 101 is formed between a pair of substrates (e.g., glass substrates) opposing each other, the plane of the liquid crystal layer 101 is parallel to the substrate plane, and the thickness of the liquid crystal layer 101 is defined in the direction normal to the substrate plane. Moreover, the display plane of the LCD 100 is parallel to the substrate plane.

The liquid crystal layer 101 is a horizontal orientation liquid crystal layer. Herein, a homogenous alignment type liquid crystal layer formed by a nematic liquid crystal material having a positive dielectric anisotropy and a horizontal alignment film having been subjected to a rubbing process will be used as an example. Moreover, the liquid crystal layer 101 is divided orientation-wise into two domains 101a and 101b (in other words, the liquid crystal layer 101 has a multi-domain structure) in order to improve the viewing angle characteristics. Each ellipse in FIG. 1 schematically represents a liquid crystal molecule 10. Arrows 116a and 116b (denoted collectively as "116") represent the orientation axis directions of the domains 101a and 101b, respectively. The orientation axis directions 116a and 116b differ from each other by 180°, and the domains 101a and 101b are arranged so as to oppose each other. The liquid crystal layer 101 of FIG. 1 schematically represents a liquid crystal layer in the absence of an applied voltage.

Note that the orientation axis direction is a direction defined by the azimuth angle of the orientation direction of the liquid crystal molecules 10 near the center of the liquid crystal layer in the thickness direction thereof, and it is defined in view of the pretilt of the liquid crystal molecules 10 (an inclination in a plane perpendicular to the substrate plane) with the tip of the arrow corresponding to the end of the liquid crystal molecules 10 that goes up when the liquid crystal molecules 10 rise from the substrate plane in response to an applied voltage. Moreover, for the purpose of illustrating the viewing angle characteristics, the direction parallel to the orientation axis direction 116 (116a and 116b) will be referred to as the "top-bottom direction", and the direction perpendicular thereto will be referred to as the "left-right direction", with respect to the observer.

Each of the phase difference compensators 102, 103, 104 and 105 may be any compensator having an appropriate refractive index anisotropy, such as an phase difference compensation film, phase difference compensation plate or a liquid crystal cell. Each of arrows 108 and 109 of the phase difference compensators 102 and 103 represents an axis along which the refractive index ellipsoid of the respective one of the phase difference compensators (all having positive, uniaxial characteristics) has the maximum refractive index (i.e., the slow axis). The phase difference compensators 104 and 105 are biaxial phase difference compensators, and each of arrows 110 and 111 extending in the direction normal to the plane of the respective one of the compensators represents an axis along which the compensator as a whole has the maximum refractive index, while each of arrows 112 and 113 extending in the plane of the respective one of the compensators represents an axis of the maximum refractive index in the plane of the compensator. Each of arrows 114 and 115 of the polarizers 106 and 107 represents the polarization axis (transmission axis).

The orientation axis direction 116 (116a and 116b), the slow axes 108 and 109, the axes 112 and 113 of the maximum in-plane refractive index, and the polarization axes 114 and 115 are each in a plane parallel to the substrate plane of the liquid crystal cell. Moreover, the slow axes 108 and 109 are both generally orthogonal to the orientation axis direction 116. Furthermore, the axis 112 of the maximum in-plane refractive index is generally orthogonal to the polarization axis 114, and the axis 113 of the maximum in-plane refractive index is generally orthogonal to the polarization axis 115. The polarization axes 114 and 115 are generally orthogonal to each other. Moreover, the angle between the orientation axis direction 116 and the polarization axis 115 (and 114) is about 45°.

The LCD 100 uses the phase difference compensators 104, 102, 103 and 105 for phase difference compensation so as to cancel out, for light incident from any direction, the retardation due to the refractive index anisotropy of the liquid crystal layer 101 in the absence of an applied voltage (where the liquid crystal molecules 10 are aligned generally parallel to the substrate plane). In other words, the optical characteristics of the phase difference compensators and the liquid crystal cell of the LCD 100 are adjusted so that the polarization of linearly-polarized light having passed through the polarizer 106 is substantially the same as the polarization of light having exited from the phase difference compensator 105 after passing through the phase difference compensators 104 and 102, the liquid crystal cell 100A and the phase difference compensator 103 in this order, for any viewing angle. Moreover, since the liquid crystal layer 101 of the LCD 100 has a two-divided orientation (domains 101a and 101b), the asymmetry of the brightness change as the viewing angle is changed in the orientation axis direction (typically equal to the rubbing direction) is improved.

As described above, the LCD 100 realizes a high-quality black display in the absence of an applied voltage, irrespective of the viewing direction, and has little decrease in the contrast ratio as the viewing angle is changed toward an inclined direction in the orientation axis direction (the rubbing direction).

The function of the first configuration capable of improving the viewing angle dependence of the display quality in a black display will now be described in greater detail.

An LCD of the present invention has a horizontal orientation liquid crystal layer. A horizontal orientation liquid crystal layer is obtained by a liquid crystal material having a positive dielectric anisotropy and a horizontal alignment film. These materials are advantageous in that they are reliable and can be selected from a wide variety. The liquid crystal molecules of a horizontal orientation liquid crystal layer are in a stable alignment in the absence of an applied voltage due to an alignment process positively performed such as, for example, a rubbing process or an optical alignment process.

An example where orientation division is employed in order to improve the viewing angle dependence will now be described, though orientation division is not always necessary. It should be noted that with a configuration where an image is displayed in the NB mode by using a horizontal orientation liquid crystal layer, there is an advantage that the viewing angle dependence of the display quality of a black display can be effectively compensated for even if orientation division is employed, as will be described later.

Changes in brightness of a pixel having an undivided orientation in the top-bottom direction and the left-right direction will be described with reference to FIG. 2A, FIG. 2B and FIG. 2C. An xyz coordinate system is assumed so that the x-y plane is parallel to the substrate plane (the display plane), and the x direction and the y direction correspond to the left-right direction and the top-bottom direction, respectively (the arrow 116 in FIG. 1 is parallel to the y direction).

A liquid crystal cell 200A illustrated in FIG. 2A has a liquid crystal layer 201 between electrodes 200a and 200b. The liquid crystal layer 201 is a homogenous alignment type liquid crystal layer under an alignment control by a horizontal alignment film (having been subjected to a rubbing process; not shown) provided on each of the electrodes 200a and 200b. Each of the electrodes 200a and 200b is formed by using a transparent conductive material (e.g., ITO) on a substrate (e.g., a glass substrate; not shown). A homogenous alignment type liquid crystal layer in which the twist angle of the liquid crystal molecules in the initial alignment state is zero will be used as an example for the sake of simplicity, but the twist angle may be set to any angle from 0° to 90°.

Upon application of an appropriate electric field across the liquid crystal layer 201, the liquid crystal molecules 10 rotate (rise) about the x axis in the z-y plane, as indicated by an arrow in FIG. 2A. FIG. 2B and FIG. 2C schematically illustrate the change in the retardation of the liquid crystal layer 201 (denoted as "Re") as the viewing angle is changed in the top-bottom direction and in the left-right direction, respectively, with the electric field being applied across the liquid crystal layer 201.

When the viewing angle èb is changed in a plane parallel to the z-x plane (in the left-right direction), the retardation of the liquid crystal layer 201 changes symmetrically about the normal direction (èb=0°, the direction normal to the substrate), as illustrated in FIG. 2C. In contrast, when the viewing angle èa is changed in a plane parallel to the z-y plane (in the top-bottom direction), the retardation of the liquid crystal layer 201 changes asymmetrically about the normal direction (èa=0°), as illustrated in FIG. 2B.

Since the change in retardation is directly related to the change in brightness, the brightness changes symmetrically as èb changes (as the viewing angle changes in the left-right direction), while the brightness changes asymmetrically, and to a significant degree, as èa changes (as the viewing angle changes in the top-bottom direction). Thus, it is important to reduce the change in retardation for the change in èa.

The significant viewing angle dependence of the retardation for the change in èa is due to the optical anisotropy of the liquid crystal molecules 10. Specifically, since the long axis of the ellipsoid of the liquid crystal molecule 10 is parallel to the z-x plane and inclined toward one direction with respect to the x axis, the ellipticity of the liquid crystal molecule 10 decreases, from that when it is observed from the normal direction, as the viewing angle is inclined toward one direction in the y-z plane, whereas the ellipticity of the liquid crystal molecule 10 increases as the viewing angle is inclined toward the opposite direction. Thus, the appearance (the magnitude of the refractive index anisotropy) of the liquid crystal molecule 10 varies depending on the direction from which it is viewed, since the liquid crystal molecule 10 is inclined toward one direction. To address this problem, measures can be taken so that the above-described change in the ellipticity of the liquid crystal molecule 10 is substantially averaged regardless of the direction toward which the viewing angle is inclined. Specifically, the problem can be addressed by employing, as the liquid crystal layer 201, a multi-domain structure (e.g., a two-divided orientation) having two regions whose inclination directions differ from each other by 180°.

Figure 3B:
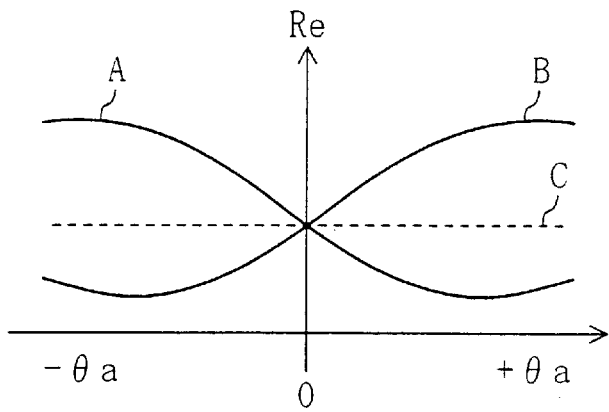
FIG. 3B is a diagram illustrating how the retardation changes as the viewing angle is changed in the top-bottom direction of the pixel.

In view of the above, in the LCD 100, each pixel is divided into the two domains 101a and 101b in which the liquid crystal molecules 10 rise in respective directions differing from each other by 180°, as illustrated in FIG. 3A. The retardations of the domains 101a and 101b change as indicated by curves A and B, respectively, in FIG. 3B, as ea changes. However, since the domains 101a and 101b coexist in a pixel that is typically as small as several 100 μm× several 100 μm, human eyes perceive the average characteristic ((A+B)/2) between the curves A and B, as indicated by a broken line C in FIG. 3B. Thus, the LCD 100 realizes a retardation change (brightness change) symmetric in the top-bottom direction by orientation division as illustrated in FIG. 1 and FIG. 3A. The first configuration realizes a high contrast ratio also when observed from an inclined direction.

The LCD 100 of the present invention is an NB mode LCD producing a black display in the absence of an applied voltage.

Typically, an LCD changes the orientation of the liquid crystal molecules by an external electric field applied across the liquid crystal layer to change the value of retardation of the liquid crystal layer, thereby changing the transmittance for light coming from a light source provided on the back of the liquid crystal cell to obtain an intended brightness for black, white or an intermediate gray level. The electric field to be applied across the liquid crystal layer to obtain a black display (i.e., the orientation of the liquid crystal molecules for realizing a black display) may be set arbitrarily. A typical liquid crystal display device using a horizontal alignment film and a liquid crystal material having a positive dielectric anisotropy employs a normally white mode (hereinafter referred to as "NW mode"), where a white display is produced in the absence of an applied voltage, with the display brightness decreasing as the applied voltage increases. In contrast, the present invention employs the NB mode, where a black display is produced in the absence of an applied voltage, with the display brightness increasing as the applied voltage increases, and the present invention realizes a display with a high contrast ratio even when observed from an inclined direction by suppressing the increase in display brightness occurring when the liquid crystal display device in a black display is observed from an inclined direction.

First, problems with conventional NW mode LCDs will be described with reference to FIG. 4A, FIG. 4B and FIG. 4C.

Figure 4A:
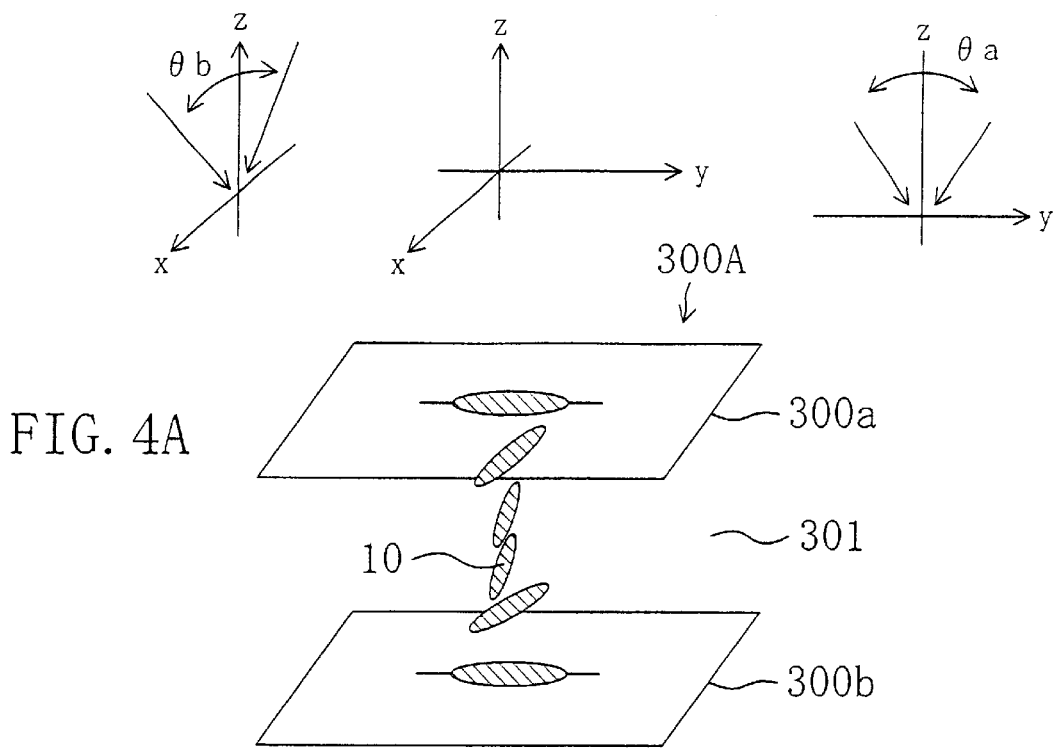
FIG. 4A is a diagram schematically illustrating a liquid crystal cell 300A having a pixel having an undivided orientation (homogenous type alignment; in a normally white mode black display)
Figure 4B:
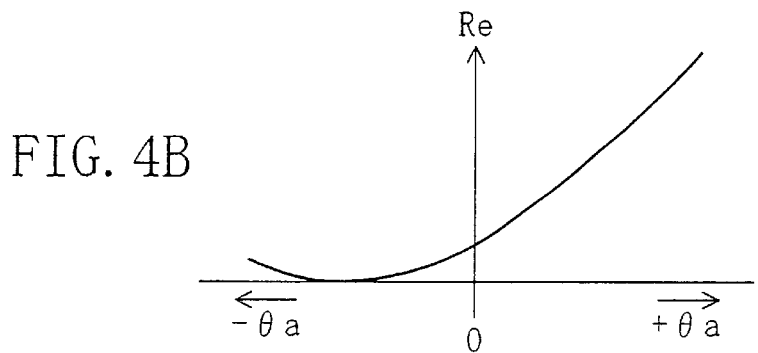
FIG. 4B is a diagram illustrating how the retardation changes as the viewing angle is changed in the top-bottom direction of the pixel.
Figure 4C:
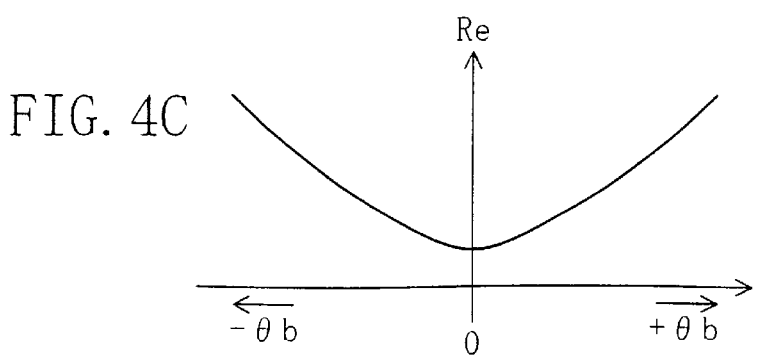
FIG. 4C is a diagram illustrating how the retardation changes as the viewing angle is changed in the left-right direction of the pixel.

A liquid crystal cell 300A schematically illustrated in FIG. 4A includes a homogenous alignment type liquid crystal layer 301 of a liquid crystal material having a positive dielectric anisotropy provided between horizontal alignment films (not shown) having been subjected to an antiparallel rubbing process. FIG. 4A schematically illustrates the liquid crystal cell 300A being in a state where a voltage sufficiently high to saturate the orientation change of the liquid crystal molecules 10 is applied between electrodes 300a and 300b, i.e., in a black display state. FIG. 4B and FIG. 4C illustrate how the retardation of the liquid crystal layer 301 changes when the viewing angle is changed in the top-bottom direction and in the left-right direction, respectively.

When a sufficient electric field is applied across the liquid crystal layer 301, the liquid crystal molecules 10 near the center of the liquid crystal layer 301 in the thickness direction thereof rotate in the y-z plane about the x axis and rise to be generally perpendicular to the substrate plane, as illustrated in FIG. 4A. The liquid crystal molecules 10 near the horizontal alignment films (i.e., near the electrodes) cannot rise due to the anchoring effect of the horizontal alignment films. As a result, the retardation of the liquid crystal layer 301 changes as indicated by a curve shown in FIG. 4B for the change in the viewing angle èa in the y-z plane, and as indicated by a curve shown in FIG. 4C for the change in the viewing angle èb in the z-x plane. It should be noted that the value of the viewing angle for which the retardation takes its minimum value differs between the curves of FIG. 4B and FIG. 4C. An inclined type phase difference compensator disclosed in Japanese Laid-Open Patent Publication No. 6-75116, in which the principal axis of refractive index is inclined from the plane of the compensator, can be used as an optical compensator capable of compensating for such a change in retardation so that the retardation value is substantially zero for any èa and èb.

Then, the increase in brightness when a black display is observed from an inclined direction is suppressed, thereby obtaining a display with a high contrast ratio even when observed from an inclined direction.

However, when a multi-domain structure as described above is employed in order to make the viewing angle dependence of the brightness in an intermediate gray level display symmetric, the following problem occurs in the NW mode.

Figure 5A:
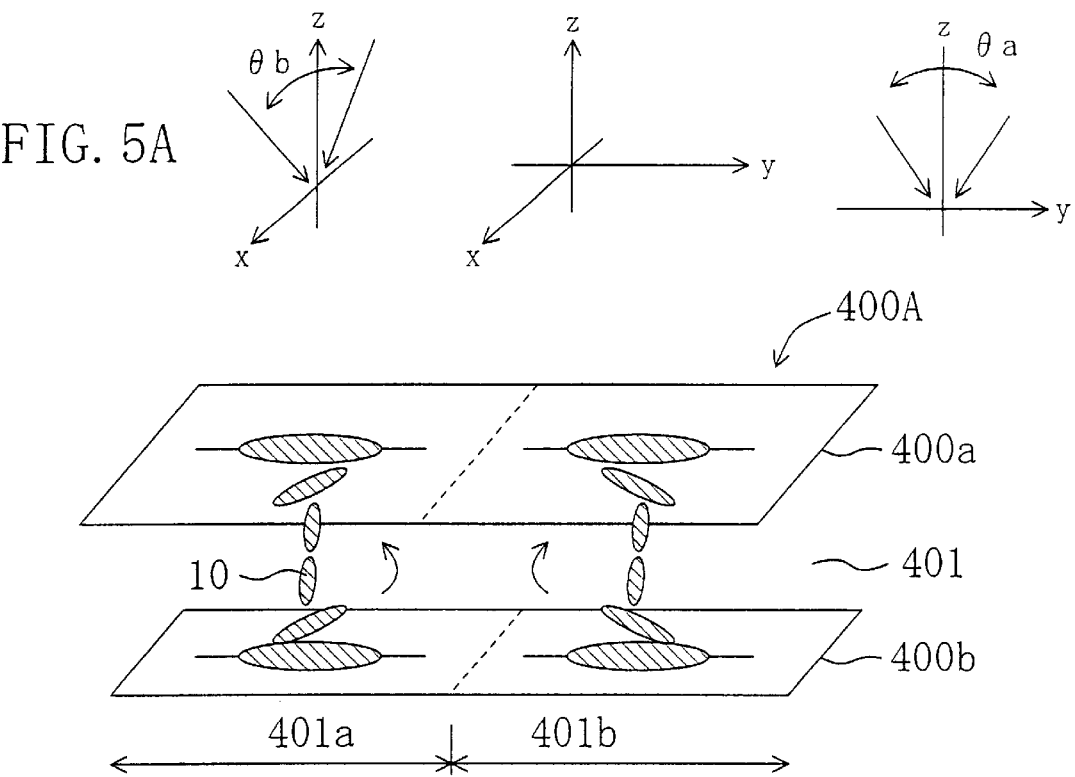
FIG. 5A is a diagram schematically illustrating a liquid crystal cell 400A having a pixel having a divided orientation (homogenous type alignment; in a normally white mode black display)

FIG. 5A schematically illustrates a liquid crystal cell 400A having a liquid crystal layer 401 having a two-divided orientation in a black display state (a state where a sufficient voltage is applied). The liquid crystal layer 401 includes two domains 401a and 401b in which the liquid crystal molecules 10 rise in respective directions differing from each other by 180°.

As illustrated in FIG. 5A, the rotation direction (rising direction) of the liquid crystal molecules 10 in the z-y plane differs between the domains 401a and 401b. Accordingly, the direction in which the liquid crystal molecules 10 that have not risen sufficiently in an intermediate gray level display rise differs between the domains 401a and 401b.

Figure 5B:
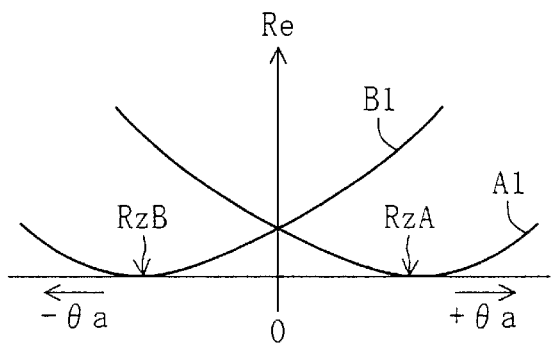
FIG. 5B is a diagram illustrating how the retardation changes as the viewing angle is changed in the top-bottom direction of the pixel.
Figure 5C:
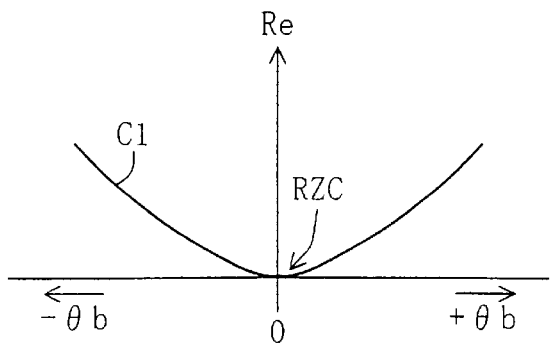
FIG. 5C is a diagram illustrating how the retardation changes as the viewing angle is changed in the left-right direction of the pixel.

For the change in the viewing angle èb in the z-x plane, the retardations of the domains 401a and 401b are substantially the same and can be represented by a curve Cl which takes its minimum value at èb=0° (normal direction), as illustrated in FIG. 5C. In contrast, for the change in the viewing angle èa in the z-y plane, the retardations of the domains 401a and 401b take their respective minimum values (RzA and RzB) at different viewing angles èa, as indicated by curves Al and B1, respectively, in FIG. 5B.

It is difficult to compensate for such a viewing angle dependence of the retardation of the liquid crystal cell 400A, for any èa and èb, by using an phase difference compensator having a uniform optical characteristic across the display plane. Of course, it may be possible to achieve such a compensation by using an phase difference compensator having a plurality of regions with different optical characteristics respectively corresponding to the domains 401a and 401b. However, such an phase difference compensator is not practical in view of the manufacturing cost and the manufacturing technique. Thus, when a LCD having a two-divided orientation is used in the NW mode, it is difficult to obtain a display with a high contrast ratio when observed from an inclined direction.

The above-described problem can be improved by employing the NB mode where a black display is produced in the absence of an applied voltage. The effect of improving the viewing angle dependence by using an phase difference compensator in the NB mode will be described with reference to FIG. 6A, FIG. 6B and FIG. 6C.

Figure 6A:
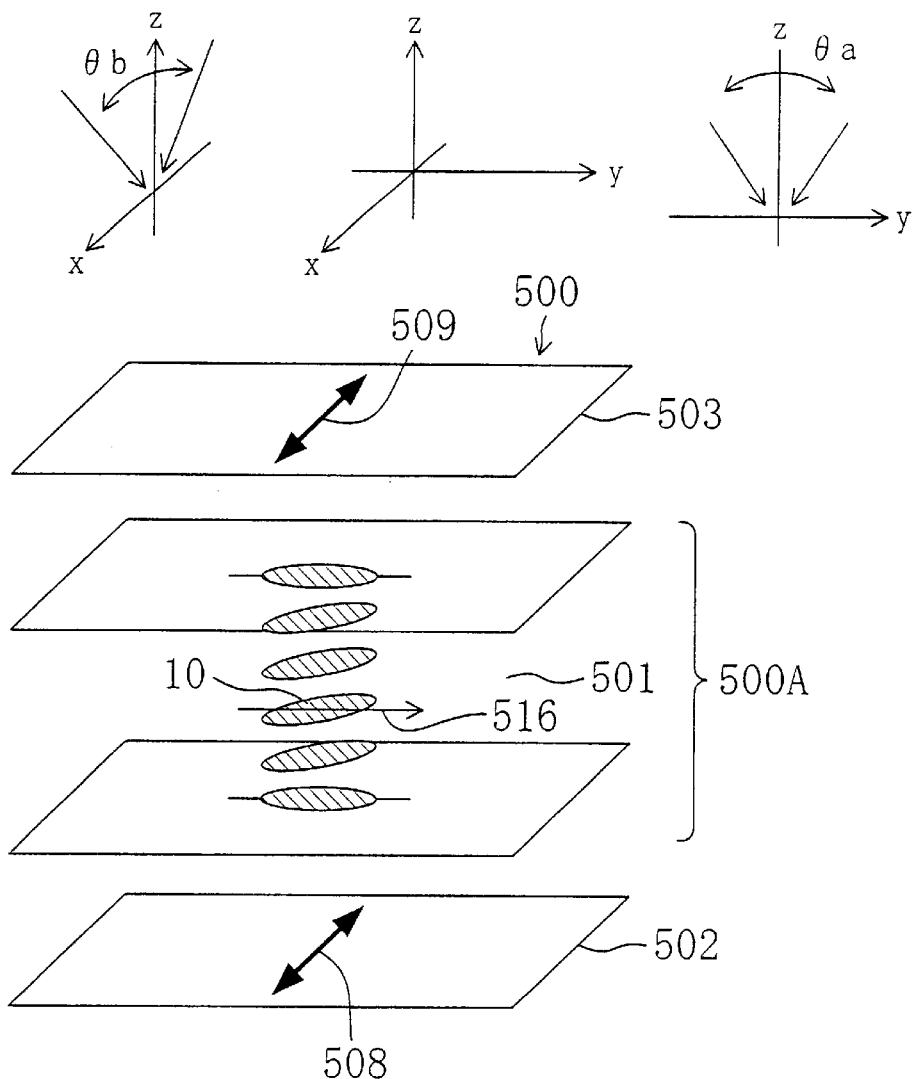
FIG. 6A is a diagram schematically illustrating a configuration 500 in which phase difference compensators 502 and 503 are provided on both sides of the liquid crystal cell 400A illustrated in FIG. 5A.

FIG. 6A schematically illustrates a configuration 500 including a liquid crystal cell 500A having a horizontal orientation liquid crystal layer 501, and phase difference compensators 502 and 503 provided respectively on both sides of the liquid crystal cell 500A. FIG. 6A illustrates the configuration 500 in the absence of an applied electric field across the liquid crystal layer 501.

As illustrated in FIG. 6A, the liquid crystal molecules 10 in the liquid crystal layer 501 are aligned to be generally parallel to the substrate plane at any position. In this state, in order to obtain a desirable black display as observed from the normal direction, first, a pair of polarizers are provided in a crossed Nicols arrangement so as to interpose the phase difference compensator 502, the liquid crystal cell 500A and the phase difference compensator 503 therebetween. Then, the phase difference compensators 502 and 503 and the liquid crystal cell 500A can be designed so that the polarization of light before it is incident upon the phase difference compensator 502 is the same as the polarization of light having exited from the phase difference compensator 503 after passing through the phase difference compensator 502, the liquid crystal cell 500A and the phase difference compensator 503 in this order. In other words, the effective retardation of the phase difference compensator 502, the liquid crystal cell 500A and the phase difference compensator 503 as a whole can be adjusted to be substantially zero.

As one way to do so, uniaxial phase difference compensators are used as the phase difference compensators 502 and 503 such that slow axes 508 and 509 are both orthogonal to a long axis direction (orientation axis direction) 516 of the liquid crystal molecules 10 and parallel to the substrate plane. Moreover, the phase difference compensators 502 and 503 are adjusted so that their retardations in the normal direction are substantially the same as each other, and so that the sum of the retardations is substantially equal to the retardation of the liquid crystal layer 501 in the absence of an applied voltage as observed from the normal direction. Since the slow axis of the liquid crystal layer 501 (parallel to 516) is orthogonal to the slow axes 508 and 509 of the phase difference compensators 502 and 503, their retardations are canceled out by each other.

Figure 6B:
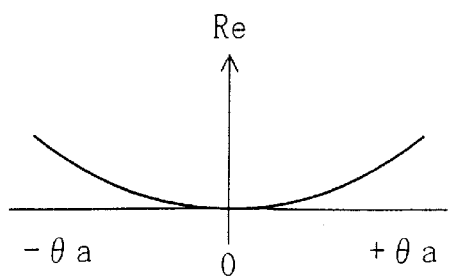
FIG. 6B is a diagram illustrating how the retardation changes as the viewing angle is changed in the top-bottom direction of the pixel.
Figure 6C:
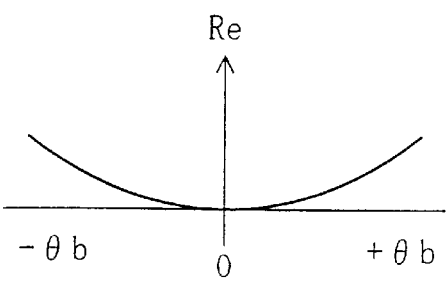
FIG. 6C is a diagram illustrating how the retardation changes as the viewing angle is changed in the left-right direction of the pixel.

FIG. 6B and FIG. 6C illustrate the change in retardation for the change in the viewing angle èa in the z-y plane and the change in the viewing angle èb in the z-x plane, respectively, of the configuration 500 illustrated in FIG. 6A. It should be noted that in either one of the curves of FIG. 6B and FIG. 6C, the minimum value of retardation occurs in the normal direction (èa=0°, èb=0°). This also applies when orientation division is employed.

Also when orientation division is employed as in the liquid crystal layer 101 of FIG. 1, the orientation of the liquid crystal molecules 10 in the absence of an applied voltage is parallel to the substrate plane at any position (the pretilt angle is small and negligible) as in the case of the liquid crystal molecules 10 of FIG. 6A, regardless of whether in the domain 101a or in the domain 101b. Therefore, the retardation of the liquid crystal layer 101 of the LCD 100 illustrated in FIG. 1 is compensated for by the phase difference compensators 102 and 103, and the total retardation thereof exhibits viewing angle dependence as illustrated in FIG. 6B and FIG. 6C.

The retardation of a horizontal orientation liquid crystal layer in the absence of an applied voltage can be compensated for even more effectively by providing another phase difference compensator, in addition to the phase difference compensators 502 and 503 illustrated in FIG. 6A, that has the maximum refractive index in the z axis direction (i.e., the direction normal to the substrate).

The viewing angle dependence of the retardation of the configuration 500 illustrated in FIG. 6B and FIG. 6C is as that of a negative uniaxial phase difference compensator that has the minimum refractive index in the direction normal to the substrate (z axis direction) and has twice as much retardation as that of the phase difference compensator 503.

Figure 7A:
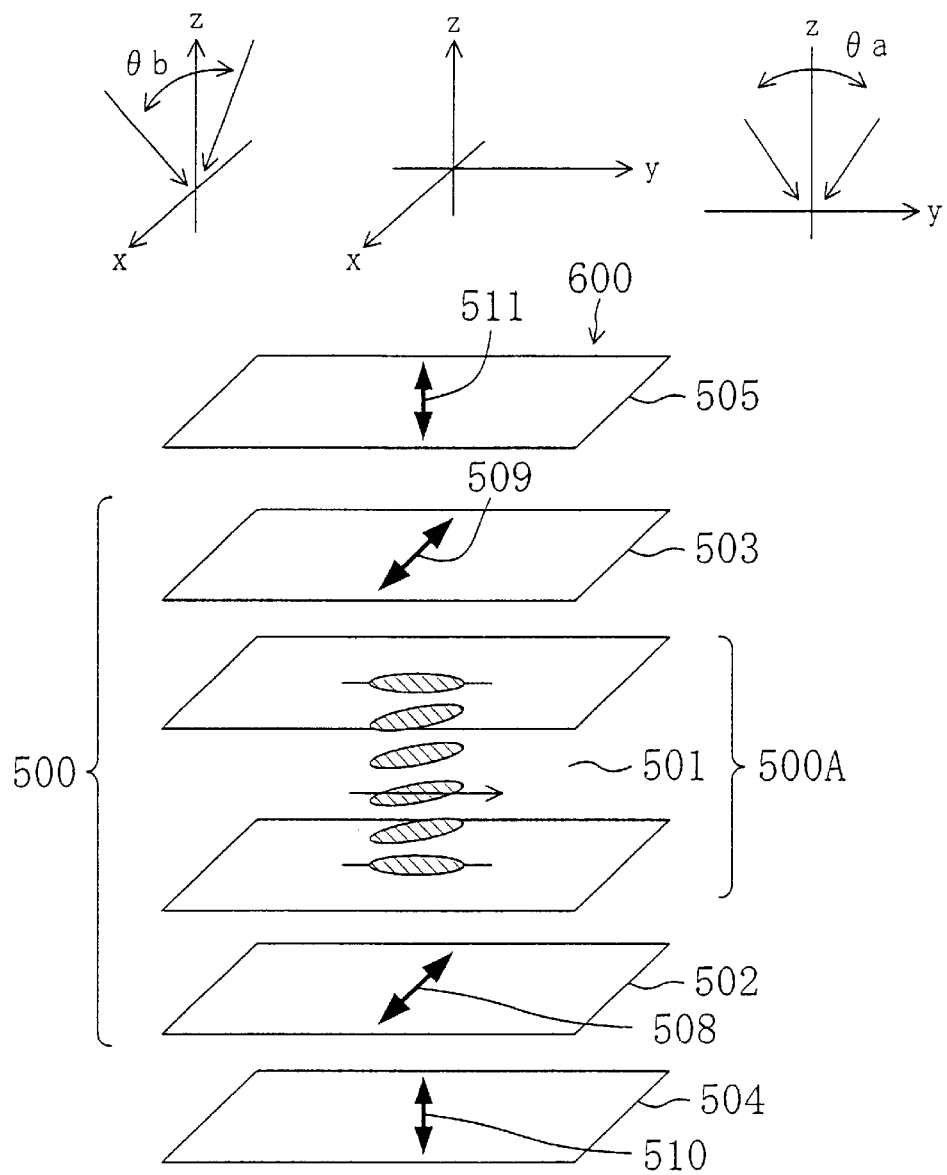
FIG. 7A is a diagram schematically illustrating a configuration 600 in which phase difference compensators 504 and 505 are further provided on both sides of the configuration 500 illustrated in FIG. 6A.

Thus, the viewing angle dependence of the retardation of the configuration 500 can be even more compensated for by, for example, further providing phase difference compensators 504 and 505 outside the configuration 500 of FIG. 6A, as in a configuration 600 illustrated in FIG. 7A. The phase difference compensators 504 and 505 are uniaxial phase difference compensators having slow axes 510 and 511, respectively, both along the z axis. The retardations of the phase difference compensators 504 and 505 are both substantially the same as that of the phase difference compensator 502 (and 503).

Figure 7B:
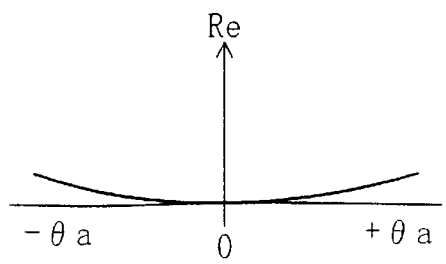
FIG. 7B is a diagram illustrating how the retardation changes as the viewing angle is changed in the top-bottom direction of the pixel.
Figure 7C:
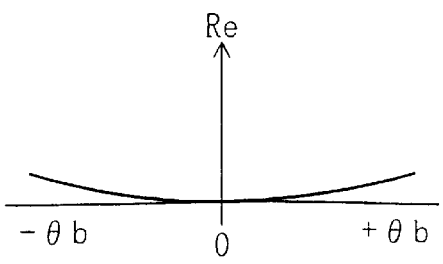
FIG. 7C is a diagram illustrating how the retardation changes as the viewing angle is changed in the left-right direction of the pixel.

FIG. 7B and FIG. 7C illustrate the change in retardation for the change in the viewing angle èa in the z-y plane and the change in the viewing angle èb in the z-x plane, respectively, of the configuration 600 illustrated in FIG. 7A. As is apparent from FIG. 7B and FIG. 7C, the retardation of the configuration 500 obtained by combining together the liquid crystal cell 500A having a horizontal orientation liquid crystal layer and the phase difference compensators 502 and 503 (the retardation illustrated in FIG. 6B and FIG. 6C) can be generally canceled out for any value of èa and èb, by combining together the positive uniaxial phase difference compensators 504 and 505 whose retardation is substantially the same as that of the phase difference compensator 502 and which has the maximum refractive index in the direction normal to the substrate. Therefore, by employing the configuration 600, it is possible to obtain an LCD capable of realizing a display with a high contrast ratio when observed from any inclined direction.

As described above, when a horizontal orientation liquid crystal layer is used in the NB mode, the effective retardation can be adjusted to be substantially zero for any èa and èb by combining together appropriate phase difference compensators, even for a liquid crystal layer having a divided orientation, whereby it is possible to easily obtain an LCD having desirable viewing angle characteristics.

Note that positive uniaxial phase difference compensators are used as the phase difference compensators 504 and 505 in the above description for the sake of simplicity. In fact, however, the retardation can be compensated for more effectively by employing biaxial phase difference compensators that have a refractive index anisotropy also in the x-y plane (the phase difference compensators 104 and 105 illustrated in FIG. 1). Of course, an phase difference compensator having its slow axis along the z axis may be combined with an phase difference compensator having its slow axis in the x-y plane.

As described above, the first configuration enables compensation of the viewing angle dependence of the retardation in a black display by providing a display device in the NB mode (where the display brightness (transmittance) is lower in the absence of an applied voltage across the liquid crystal layer than in the presence of an applied voltage across the liquid crystal layer) using a horizontal orientation liquid crystal layer. As a result, it is possible to realize a display with a high contrast ratio in which the display brightness in a black display does not increase when observed from any viewing angle. Moreover, there is another advantage that a horizontal orientation liquid crystal layer can be provided by using a liquid crystal material having a positive dielectric anisotropy and a horizontal alignment film that are desirable in terms of the productivity and stability.

Note that the above description has been directed to how the viewing angle dependence of the brightness in an intermediate gray level display in the top-bottom direction and in the left-right direction can be improved by employing orientation division of the liquid crystal layer for each pixel. However, orientation division is not indispensable, but the viewing angle dependence of the brightness in an intermediate gray level display can alternatively be improved with the second configuration to be described below. It should be noted that of course the symmetry of the viewing angle dependence of the brightness in an intermediate gray level display can be improved by employing orientation division in combination with the first configuration. More importantly, if the first configuration realizing a display device in the NB mode by using a horizontal orientation liquid crystal layer is employed, the viewing angle dependence of the retardation in a black display can be effectively compensated for, whereby the viewing angle dependence of the brightness in a black display can be effectively compensated for, also when orientation division is employed in combination therewith.

Second Configuration

Next, the second configuration for reducing the viewing angle dependence of the display brightness in the presence of an applied voltage will be described.

In the second configuration, there is produced a transverse electric field component that changes the orientation axis direction defined by the azimuth direction of the orientation direction of liquid crystal molecules near the center of the liquid crystal layer in the thickness direction thereof, thereby positively introducing a distribution in the orientation direction of the liquid crystal molecules in an intermediate gray level to white display state (a display state other than a black display state) so as to reduce the viewing angle dependence of the display brightness. Moreover, the second configuration does not adversely affect the viewing angle dependence in a black display, which is improved by the first configuration described above.

The function of the second configuration will now be described with reference to the drawings.

Figure 8A:
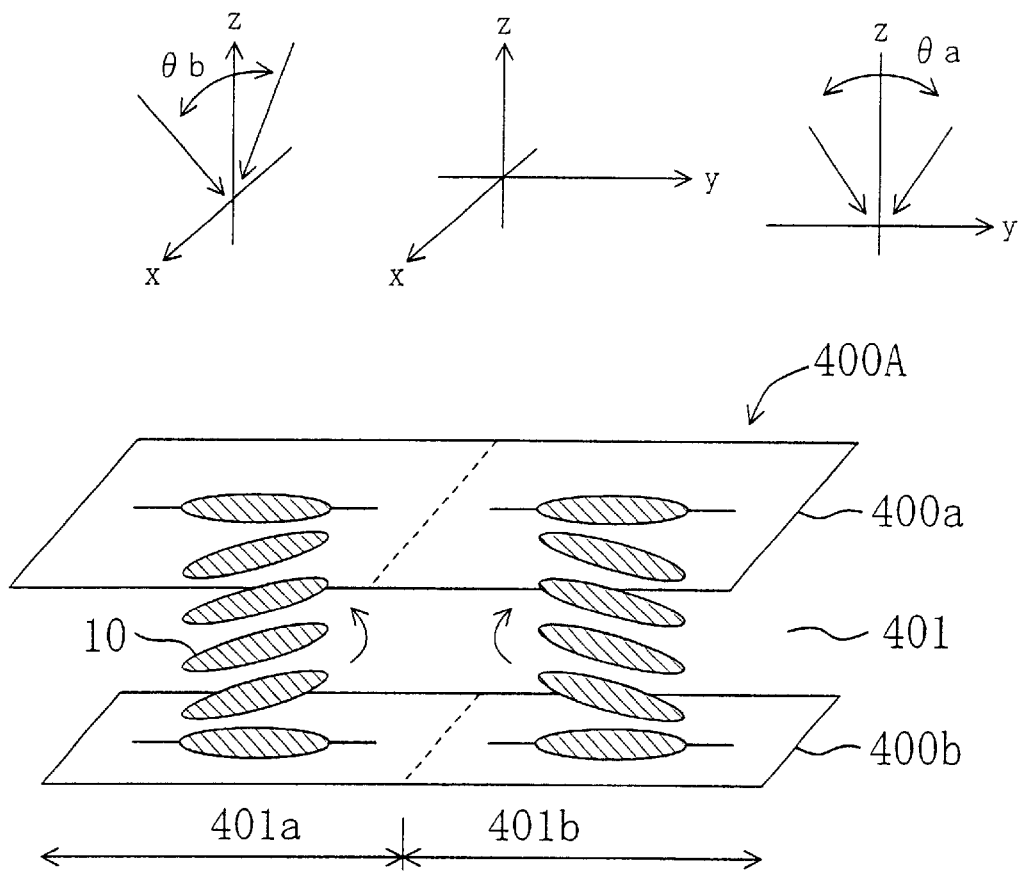
FIG. 8A is a diagram schematically illustrating the liquid crystal cell 400A illustrated in FIG. 5A with a voltage for displaying an intermediate gray level being applied thereacross.
Figure 8B:
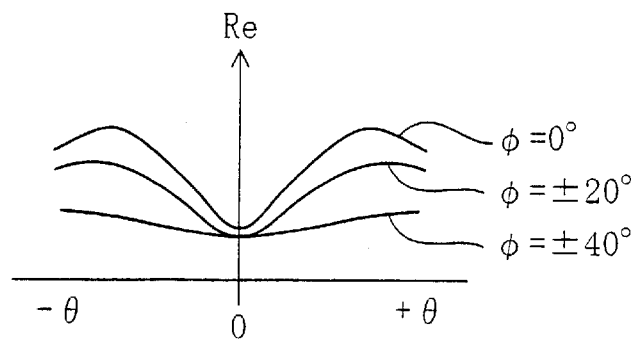
FIG. 8B is a diagram illustrating the viewing angle (è) dependence of the retardation of a liquid crystal layer 401 of the liquid crystal cell 400A for a plurality of azimuth angles $\phi$.

FIG. 8A illustrates the liquid crystal layer 401 having a two-divided orientation of the liquid crystal cell 400A of FIG. 5A with an electric field for displaying an intermediate gray level being applied across the liquid crystal layer 401. FIG. 8B schematically illustrates, for a plurality of azimuth angles $\phi$, the effective viewing angle (è) dependence of the retardation of the liquid crystal layer 401, which is obtained by combining together the respective viewing angle (è) dependences of the retardations in the domains 401a and 401b obtained by orientation division. The azimuth angle $\phi$ defines an angle between the y axis and a plane that includes the viewing angle direction and that is orthogonal to the x-y plane, with the y axis direction (parallel to the orientation axis direction of the liquid crystal layer) being 0°.

As illustrated in FIG. 8B, while the viewing angle dependence of the retardation at azimuth angle $\phi=0°$ is substantial, the viewing angle dependence of the retardation is flattened as the azimuth angle increases from $\phi=0°$ to $\phi=\pm20°$ and $\phi=\pm40°$. This is because of the optical anisotropy of liquid crystal molecules such that the refractive index changes substantially as the viewing angle changes in a direction including the long axis of the refractive index ellipsoid (the long axis of liquid crystal molecules), whereas the refractive index does not change substantially as the viewing angle changes in a direction including the short axis of the refractive index ellipsoid. This suggests that it is possible to average the viewing angle dependence and to realize a gray level display with reduced viewing angle dependence by adding together the viewing angle dependence at azimuth angle $\phi=0°$ with those at azimuth angles $\phi=\pm20°$ and $\phi=\pm40°$.

In the present invention, an effect equivalent to adding together the viewing angle dependences for different azimuth angles as described above is obtained by positively controlling the angle between the orientation direction of the liquid crystal molecules (the axis obtained by orthogonally projecting the long axis of the liquid crystal molecules onto the substrate) and the y axis so as to introduce a distribution in the value of φLC in the plane of the liquid crystal layer and in the thickness direction of the cell (so that the value is not constant across the cell).

Figure 9A:
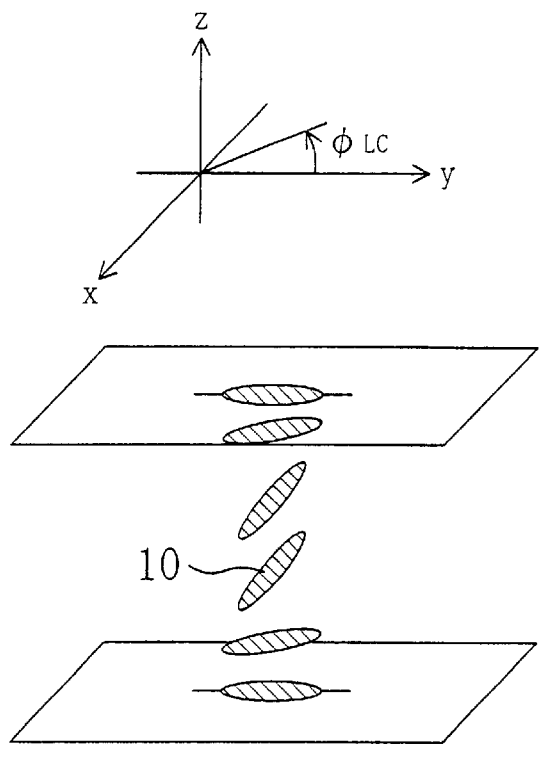
FIG. 9A is a diagram schematically illustrating an orientation in which the orientation directions of the liquid crystal molecules are aligned with one another.
Figure 9B:
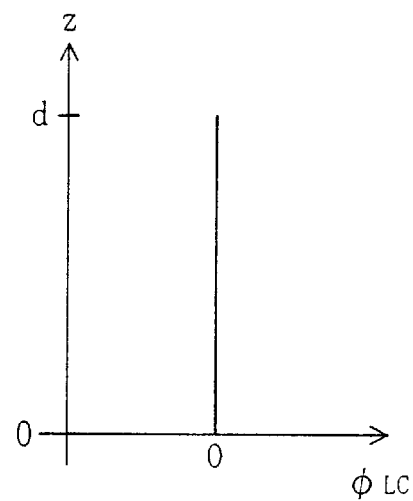
FIG. 9B and FIG. 9D are diagrams each illustrating a distribution, in the thickness direction, of the orientation directions $\phi$LC of the liquid crystal molecules of the liquid crystal layer illustrated in FIG. 9A and FIG. 9C, respectively.

FIG. 9A schematically illustrates an orientation in which the orientation directions of the liquid crystal molecules 10 are aligned with one another (as in the liquid crystal layer 401 described above), and FIG. 9C schematically illustrates an orientation in which there is a distribution of the orientation directions of the liquid crystal molecules 10 in the thickness direction of the liquid crystal layer. FIG. 9B and FIG. 9D each illustrate a distribution, in the thickness direction, of the orientation directions φLC of the liquid crystal molecules of the liquid crystal layer illustrated in FIG. 9A and FIG. 9C, respectively. In FIG. 9B and FIG. 9D, the horizontal axis represents φLC, and the vertical axis represents the position z in the thickness of the liquid crystal layer. In FIG. 9B and FIG. 9D, z=0 represents a position on one substrate (alignment film) and z=d represents a position on the other substrate (alignment film), where d denotes the thickness of the liquid crystal layer.

Where the orientation directions of the liquid crystal molecules are aligned with one another, as illustrated in FIG. 9A, the liquid crystal molecules rotate about the x axis in response to an applied electric field. Therefore, even in an intermediate gray level display, the orientation direction of the liquid crystal molecules is constant (φLC=0°) at any position in the thickness direction, as illustrated in FIG. 9B, and is also constant at any position in the plane of the liquid crystal layer.

Figure 9C:
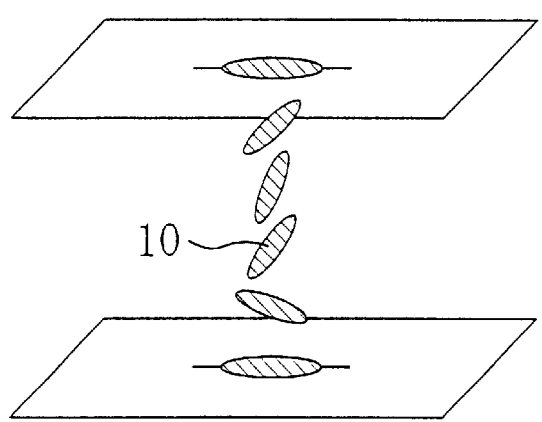
FIG. 9C is a diagram schematically illustrating an orientation in which there is a distribution of the orientation directions of the liquid crystal molecules in the thickness direction of the liquid crystal layer.
Figure 9D:
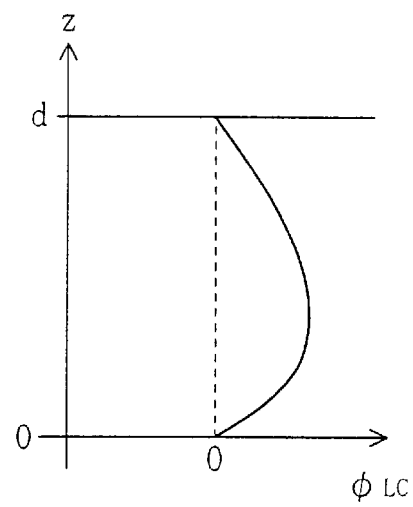

In contrast, according to the present invention, the orientation directions φLC of the liquid crystal molecules are not aligned (have a distribution) in the thickness direction in an intermediate gray level display (in the presence of an applied voltage), as conceptually illustrated in FIG. 9C. It is important to ensure that the orientation directions φLC of the liquid crystal molecules are not aligned (have a distribution) only in the presence of an applied voltage, while the effect is lost in the absence of an applied voltage, i.e., in a black display. This is because the orientation of the liquid crystal molecules in the absence of an applied voltage is defined by the first configuration so as to control the viewing angle dependence in a black display.

The introduction of a distribution in the orientation direction φLC of the liquid crystal molecules only in the presence of an applied voltage, as conceptually illustrated in FIG. 9D, can be realized by, for example, producing a transverse electric field component. A transverse electric field component can be produced by, for example, providing openings (typically slit-shaped openings) in one of a pair of electrodes opposing each other via a liquid crystal layer therebetween.

Figure 10A:
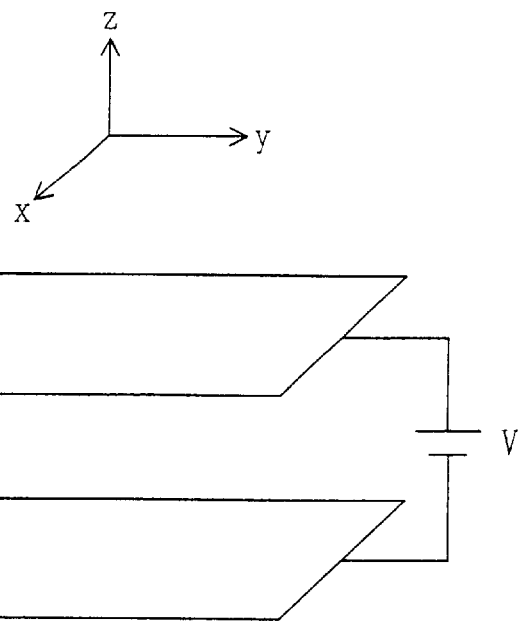
FIG. 10A is a diagram schematically illustrating a pair of electrodes, each being a flat and uniform conductive layer and having a generally uniform conductivity within each pixel.
Figure 10B:
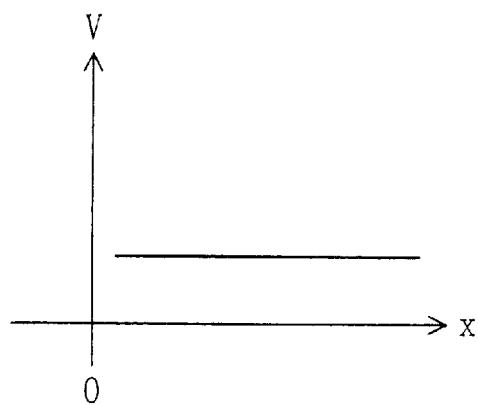

A typical electrode used in a liquid crystal cell is a flat and uniform conductive layer and has a generally uniform conductivity across each pixel, as electrodes 1000a and 1000b illustrated in FIG. 10A. Therefore, the potential between the electrodes, i.e., the potential in a plane parallel to the electrode plane in the liquid crystal layer (i.e., the plane of the liquid crystal layer, the substrate plane, the x-y plane), is constant at any position. For example, the potential distribution along an arbitrary axis parallel to the x axis (or the y axis) in an arbitrary plane parallel to the plane of a liquid crystal layer 1001 is constant, as illustrated in FIG. 10B. Therefore, an electric field component parallel to the plane of the liquid crystal layer 1001 (a transverse electric field component) is not produced. Of course, the potential varies as a function (typically a linear function) of the position (thickness) in the direction normal to the plane of the liquid crystal layer 1001 (the thickness direction, the z axis direction), and an electric field (vertical electric field component) is generated in the thickness direction of the liquid crystal layer 1001.

An embodiment of a liquid crystal display device having the second configuration of the present invention will be described with reference to FIG. 11A, FIG. 11B, FIG. 11C and FIG. 11D.

Figure 11A:
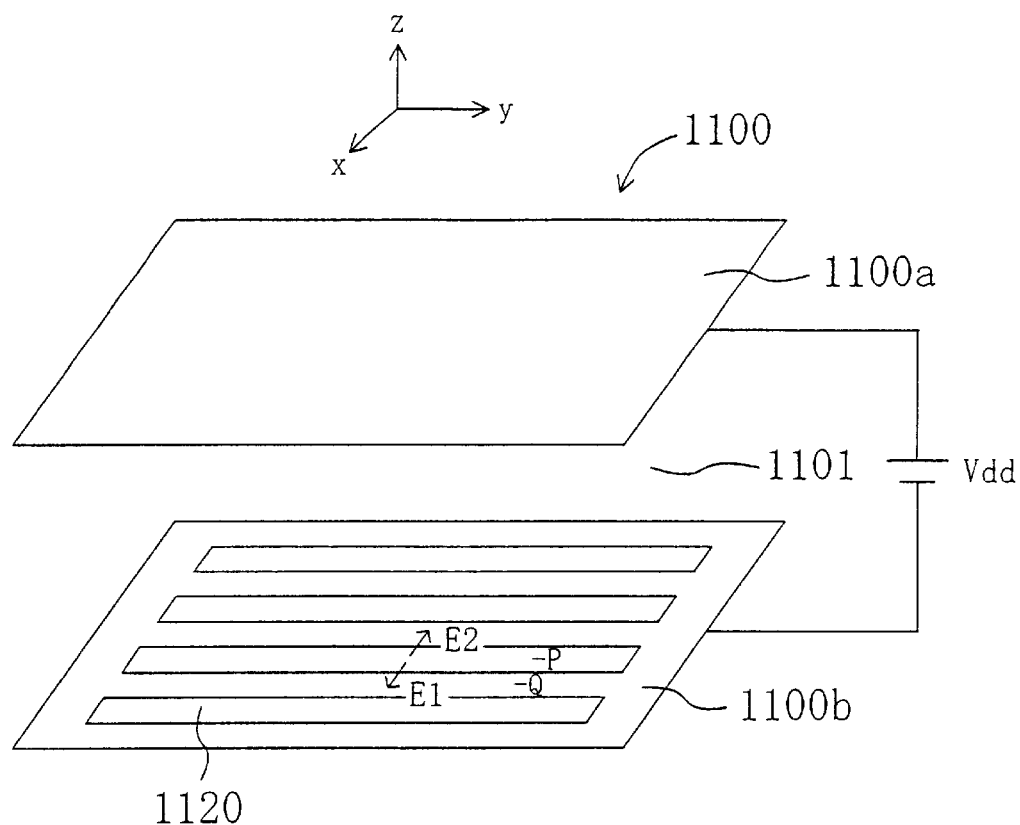

In a liquid crystal cell 1100 illustrated in FIG. 11A, one of electrodes 1100a and 1100b (the electrode 1100b in the illustrated example) provided so as to oppose each other via a liquid crystal layer 1101 therebetween includes a plurality of slit-shaped openings 1120 generally parallel to one another. The long side of each of the slit-shaped openings 1120 is parallel to the y axis, and the slit-shaped openings 1120 are arranged in the perpendicular direction (the x axis).

Note that having the long side of the slit-shaped openings 1120 generally parallel to the orientation direction of the liquid crystal molecules (the y axis) provides an effect of ensuring the symmetry of the change in the orientation of the liquid crystal molecules by a transverse electric field component and preventing the orientation of the liquid crystal molecules from changing discontinuously. In order to obtain such an effect, it is preferred that the angle between the orientation axis direction in the absence of an applied voltage and the long side direction of the slit-shaped openings 1120 (the y axis in the drawings) is 30° or less.

The function of the electrode structure having the slit-shaped openings 1120 will be described with reference to FIG. 11B, FIG. 11C and FIG. 11D.

Figure 11B:
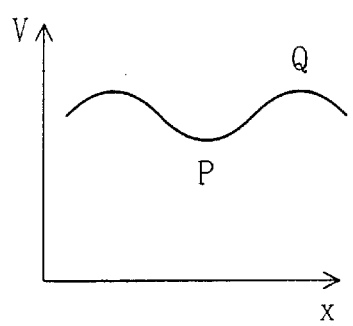

When a voltage is applied between the electrodes 1100a and 1100b illustrated in FIG. 11A, the potential at a point in the liquid crystal layer 1101 having an arbitrary (y, z) value and along an axis parallel to the x axis changes in the x direction as illustrated in FIG. 11B. Moreover, the potential at a point in the liquid crystal layer 1101 having an arbitrary (z, x) value and along an axis parallel to the y axis is represented as in FIG. 11c with respect to the y axis direction. Furthermore, the potential at a point in the liquid crystal layer 1101 having an arbitrary (x, y) value and along an axis parallel to the z direction changes in the z direction as illustrated in FIG. 11D.

As illustrated in FIG. 11B, the potential distribution along the x axis in the plane of the liquid crystal layer 1101 is represented by a curve periodically exhibiting the maximum value (apex) and the minimum value (bottom). The position at which the potential has the minimum value corresponds to the center (a point P in FIG. 11A) of the slit-shaped opening 1120 in the width direction (x direction), and the position at which the potential has the maximum value corresponds to the center (a point Q in FIG. 11A) of the area where the electrode (conductive layer (non-opening)) actually exists. The difference in magnitude of the potential change along the x axis (the scale of the vertical axis of FIG. 11B) varies depending on the (y, z) value.

Figure 11C:
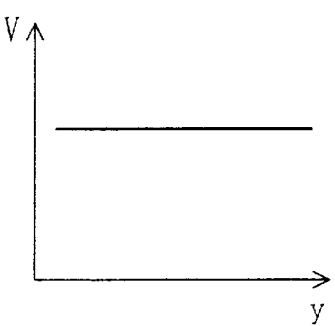

The potential is constant along the y axis in the plane of the liquid crystal layer 1101, as illustrated in FIG. 11C, and the magnitude thereof (the scale of the vertical axis of FIG. 11C) varies depending on the (z, y) value. Moreover, in the thickness direction of the liquid crystal layer 1101 (the z direction), the potential changes as a function of the position as illustrated in FIG. 11D. The scale of the vertical axis of FIG. 11D varies depending on the (x, y) value of the position, whereby the gradient of the potential (the strength of the vertical electric field) along the z axis also varies depending on the position.

Figure 11D:
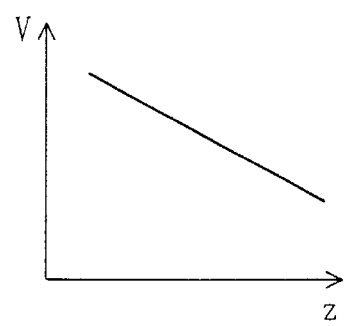

As can be seen from FIG. 11B to FIG. 11D, when a voltage is applied between the electrodes 1100a and 1100b illustrated in FIG. 11A, an electric field component in the x axis direction (a transverse electric field) is generated in addition to the electric field component in the z axis direction (a vertical electric field). It can also be seen that the directions of the electric field components in the x axis direction are symmetrical (opposite in the illustrated example) as indicated by arrows E1 and E2 of FIG. 11A. Therefore, the electrode structure of the present invention does not adversely affect the reliability, etc., of a liquid crystal display device.

The potential distribution illustrated in FIG. 11B will now be described in greater detail with reference to FIG. 12A and FIG. 12B.

The potential of the electrode 1100a illustrated in FIG. 11A is determined by the external power supply (Vdd). Similarly, the potential at the point Q of the electrode 1100b having the openings 1120 is also determined by the external power supply. However, since no external power supply is connected to the point P, the potential at the point P is determined by the potential of the electrode 1100a, the potential at the point Q of the electrode 1100b and the potential at the point at infinity. Therefore, the relationship among the width of the portion of the electrode 1100b where the electrode (conductive layer) actually exists (also referred to as "solid portion"), the width of the opening 1120, and the interval between the electrodes 1100a and 1100b, is an important parameter in determining the relative magnitude of the transverse electric field component. It has been experimentally confirmed that in order to average the viewing angle dependence of the brightness in the presence of an applied voltage, it is preferred that the width of the opening 1120 is about 0.1 to 10 times the interval between the electrodes 1100a and 1100b (the thickness of the liquid crystal layer) while the width of the solid portion of the electrode is about 0.1 to 10 times the width of the opening of the electrode. Note that under such a condition, the influence of the potential at the point at infinity on the potential at the point P is substantially negligible. Therefore, when the potential at the point Q and the potential of the electrode 1100a are equal to each other, i.e., in the absence of an applied voltage, the potential at the point P is also equal to the potential of the electrode 1100a, thereby producing no transverse electric field component.

Figure 12A:
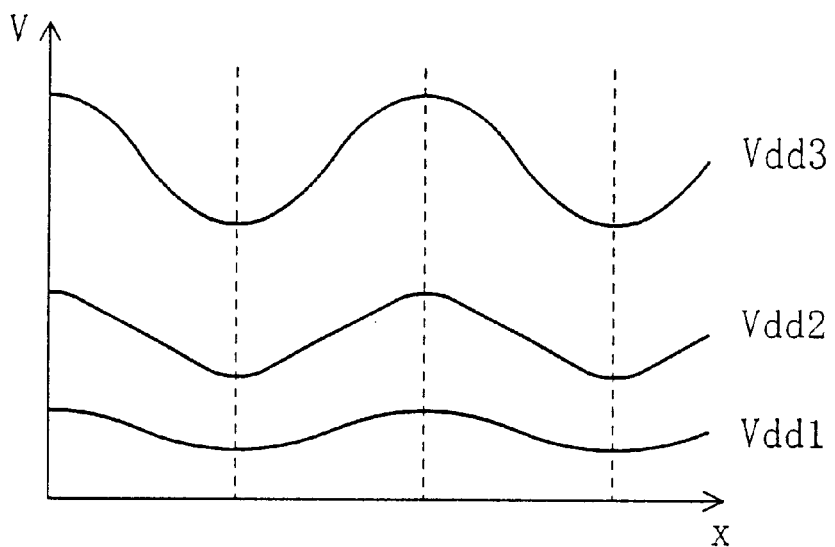
FIG. 12A is a diagram schematically illustrating a potential distribution in the x direction in the liquid crystal layer 1101 of the liquid crystal cell 1100A illustrated in FIG. 11A.

The potential distribution along the x axis in the plane of the liquid crystal layer 1101 depends on the magnitude of the potential difference VDD between the electrodes 1100a and 1100b, and changes as illustrated in FIG. 12A, for example. Thus, the magnitude of the transverse electric field component is greater as VDD is greater, in other words, as the electric field in the cell thickness direction is stronger. Therefore, as illustrated in FIG. 12B, the φLC distribution in the thickness direction also depends on the magnitude of VDD, and the magnitude of the change in φLC is greater as VDD is greater.

As described above, application of a voltage between electrodes one of which includes openings, as illustrated in FIG. 11A, produces a transverse electric field component that changes the orientation direction of the liquid crystal molecules (represented by the azimuth angle φLC), thereby creating a distribution in the orientation direction of the liquid crystal molecules along the thickness of the liquid crystal layer.

Figure 12B:
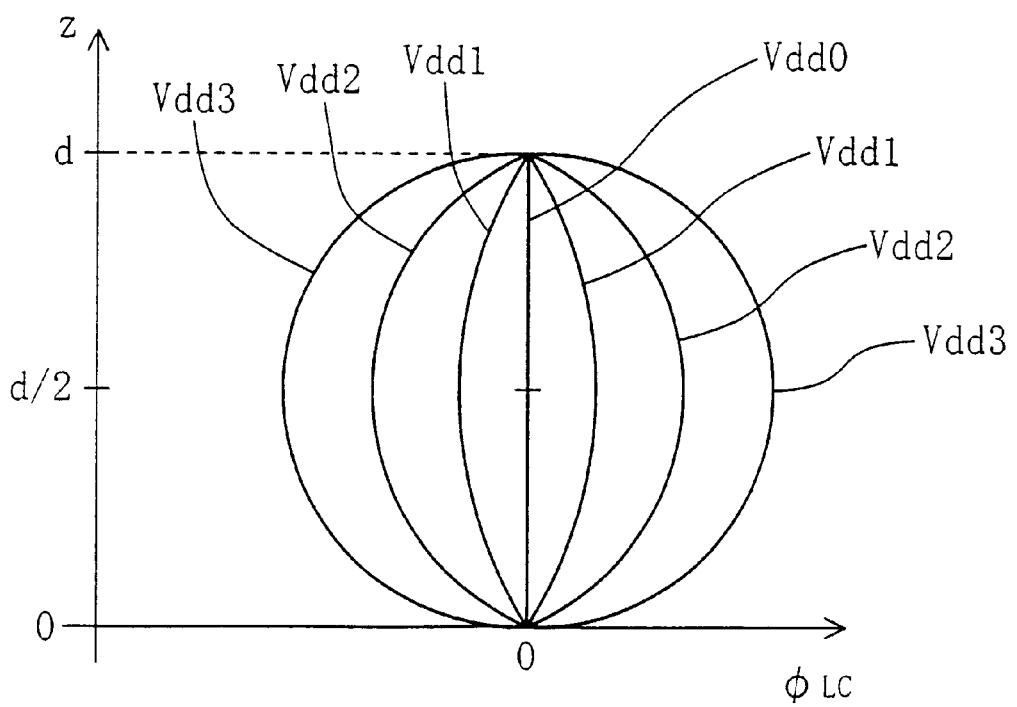
FIG. 12B is a diagram schematically illustrating a distribution, in the thickness direction, of the orientation directions ($\phi$LC) of the liquid crystal molecules in the liquid crystal layer 1101.

Moreover, since the potential has a distribution in the x axis direction in the plane of the liquid crystal layer 1101, as illustrated in FIG. 12A, the distribution of φLC in the thickness direction illustrated in FIG. 12B also depends on the position along the x axis. Thus, the orientation direction φLC of the liquid crystal molecules varies for different points with the same z coordinate if the points are at different positions along the x axis.

Thus, in an intermediate gray level to white display state (a display state other than a black display state) where a voltage is applied between the electrodes 1100a and 1100b, a distribution is introduced in the orientation direction of the liquid crystal molecules (the orientation directions are not aligned with one another), thereby reducing the viewing angle dependence of the display brightness. The distribution of the orientation direction (φLC) is created not only in the thickness direction of the liquid crystal layer 1101 (the z direction) but also in the x axis direction in the plane of the liquid crystal layer 1101.

The phenomenon as described above, in which a transverse electric field component according to the applied voltage causes the orientation direction of the liquid crystal molecules to vary depending on the position in the liquid crystal layer, can be explained as follows.

Defining the orientation axis direction as being a direction defined by the azimuth angle of the orientation direction of the liquid crystal molecules near the center of the liquid crystal layer in the thickness direction thereof, the above-described phenomenon can be said to be a phenomenon in which the orientation axis direction is changed by the transverse electric field component produced upon application of a voltage. Specifically, each of the liquid crystal molecules aligned in a certain orientation axis direction in the absence of an applied voltage changes its orientation axis direction by the transverse electric field component produced upon application of a voltage. The degree of the change depends on the magnitude of the transverse electric field, and thus may vary depending on its position in the liquid crystal layer (the position in the thickness direction of the liquid crystal layer and/or the position in the plane of the liquid crystal layer). Therefore, a plurality of regions having different orientation axis directions are created in the liquid crystal layer in the presence of an applied voltage, thereby averaging the viewing angle dependence.

As described above, the second configuration realized by an electrode structure including openings does not disturb the orientation of the liquid crystal molecules in the absence of an applied voltage which is required by the first configuration. Conversely, applying the second configuration to a liquid crystal display device in the NW mode including a horizontal alignment film and a liquid crystal material having a positive dielectric anisotropy is not practical. This is because while it is necessary to provide a sufficient potential to the bottom portion in FIG. 12A, i.e., the point P in FIG. 11A, in order to obtain sufficient black display characteristics with a liquid crystal display device in the NW mode, it is difficult to do so with the electrode structure of FIG. 11A. Therefore, the second configuration satisfies the requirement of the first configuration, and the second configuration requires the characteristics of the first configuration (NB mode). In other words, the first configuration and the second configuration allow each other to exert the respective effects.

In the above description, the effect of a transverse electric field component has been described with respect to a homogenous alignment type liquid crystal layer in which the twist angle of the liquid crystal molecules in the initial alignment state is 0°. However, similar functions/effects can also be obtained with a twisted liquid crystal layer having a twist angle greater than 0°. The functions/effects of a transverse electric field component with respect to a twisted liquid crystal layer in which the twist angle is 90° will be described with reference to FIG. 13.

Figure 10C:
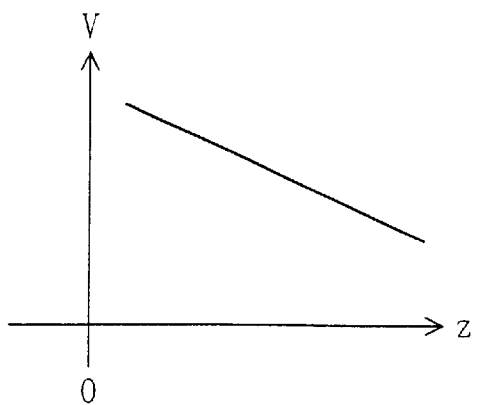
Figure 13:
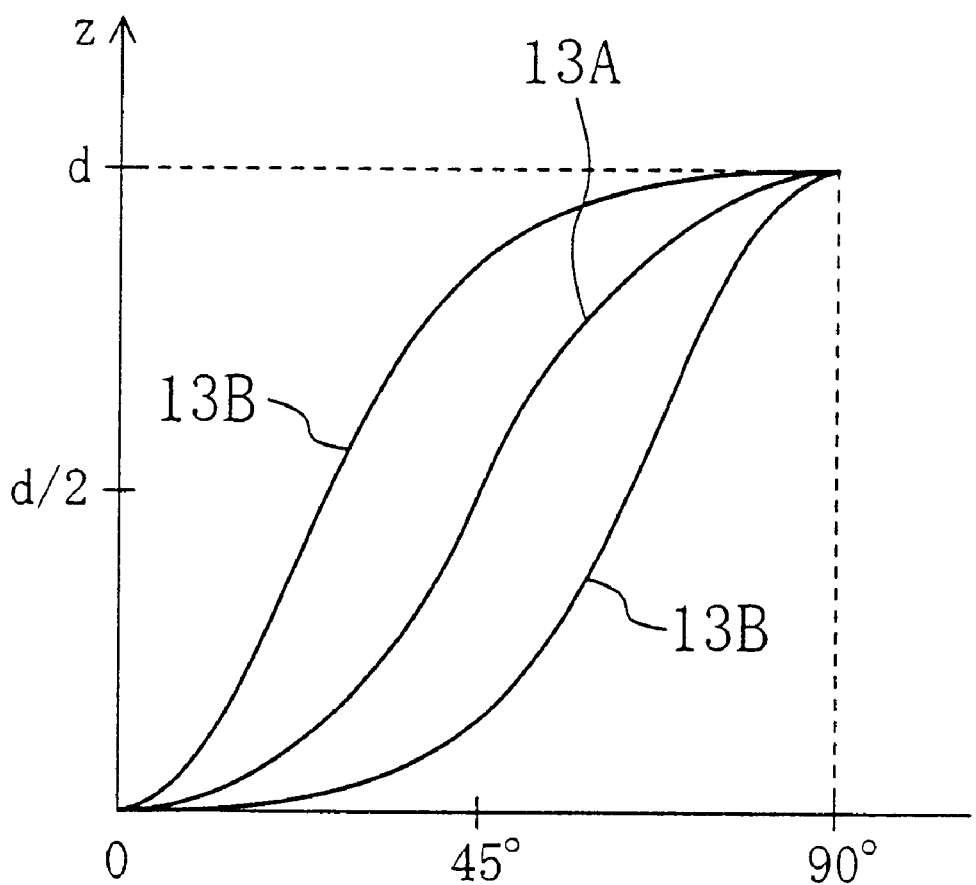
FIG. 13 is a diagram schematically illustrating a distribution, in the thickness direction, of the orientation directions ($\phi$LC) of the liquid crystal molecules, with an electric field for displaying an intermediate gray level being applied across a 90° twisted liquid crystal layer.

FIG. 13 schematically illustrates a distribution, in the thickness direction, of the orientation directions (φLC) of the liquid crystal molecules, with an electric field for displaying an intermediate gray level being applied across a 90° twisted liquid crystal layer. A curve 13A corresponds to a case where conventional, flat and uniform electrodes (see FIG. 10) are used, and a curve 13B corresponds to a case where electrodes one of which includes openings, as illustrated in FIG. 11A, are used.

In the case of conventional electrodes, the liquid crystal molecules of the 90° twisted liquid crystal layer change the azimuth angle φLC of the orientation direction by 90° from the surface of one electrode to the surface of the other electrode, as shown by the curve 13A. The azimuth angle φLC of the liquid crystal molecules near the center of the liquid crystal layer in the thickness direction (z d/2) is 45°. This is not changed by changing the electric field to be applied across the liquid crystal layer.

On the other hand, in the case of the electrodes one of which includes openings formed therein, the azimuth angle φLC of the orientation direction of the liquid crystal molecules changes in the thickness direction, as illustrated in FIG. 13B, because of the action of a transverse electric field component. As can be seen from the figure, the azimuth angle of the liquid crystal molecules near the center of the liquid crystal layer (the orientation axis direction) is shifted from 45° due to the influence of a transverse electric field component.

Thus, even in the case where a 90° twisted liquid crystal layer is used, it is possible to change the orientation axis direction of the liquid crystal layer and to reduce the viewing angle dependence by, for example, producing a transverse electric field component using the electrodes one of which includes slit-shaped openings as described above.

EXAMPLES

The liquid crystal display device of the present invention will now be described by way of specific examples and comparative examples.

Example 1

First, a liquid crystal display device only having the first configuration will be described. An LCD of Example 1 has substantially the same configuration as that of the LCD 100 illustrated in FIG. 1, and FIG. 1 will be referred to in the following description. The liquid crystal layer 101 is a homogenous alignment type liquid crystal layer, including the two domains 101a and 101b whose orientation axis directions differ from each other by 180° for each pixel.

Figure 14:
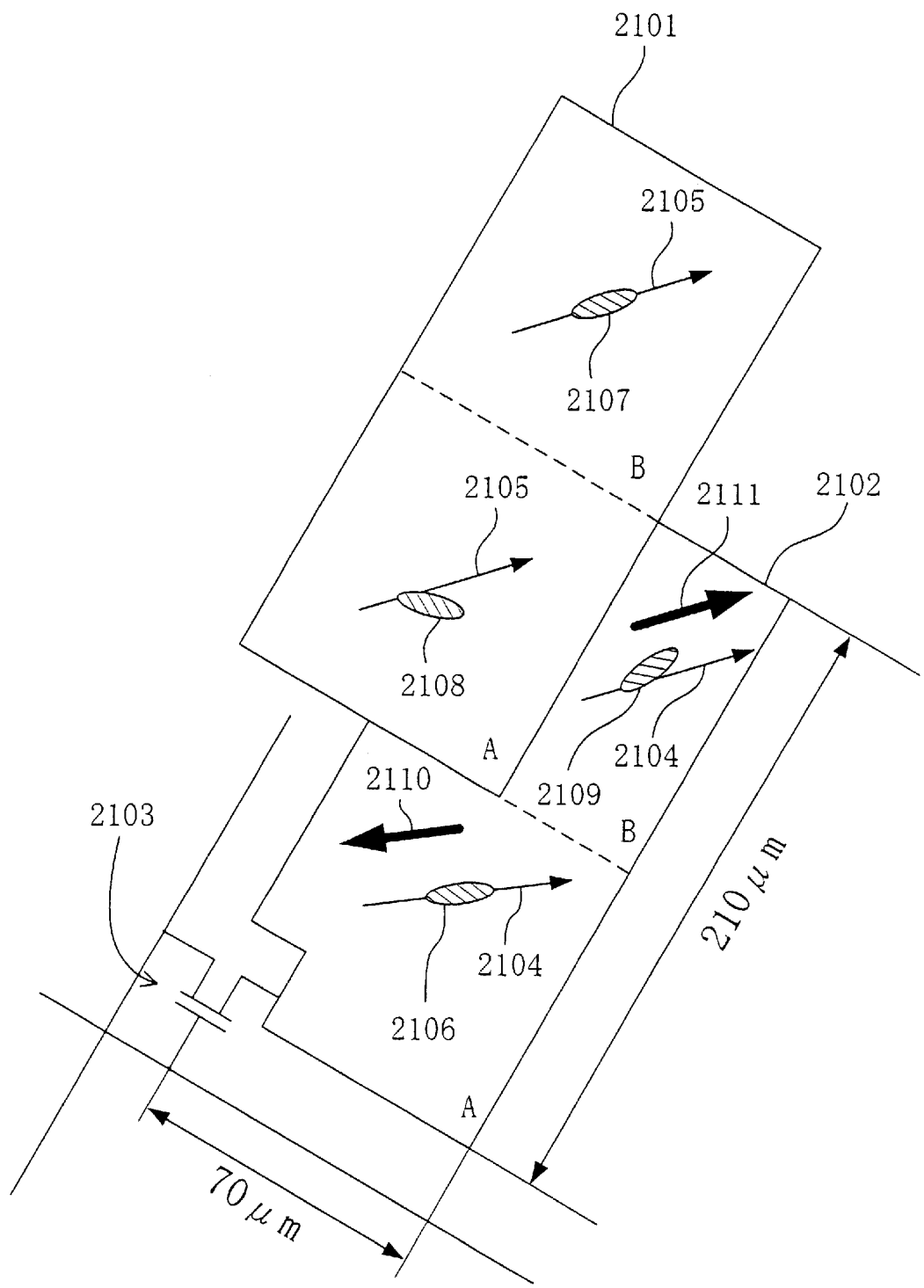
FIG. 14 is a diagram schematically illustrating an electrode structure of a pixel of an LCD of Example 1 and an orientation of the liquid crystal molecules.

Specific electrode structure of each pixel and the orientation of the liquid crystal molecules of the LCD of Example 1 are illustrated in FIG. 14. The LCD of Example 1 illustrated in FIG. 14 is a color TFT-LCD, and a counter electrode 2101 and a pixel electrode 2102 respectively correspond to the electrodes 100a and 100b of the LCD 100 illustrated in FIG. 1.

The counter electrode 2101 is a single electrode provided as a common electrode for all the pixels, and each pixel electrode 2102 is connected to a TFT 2103. Each pixel electrode 2102 and a portion of the counter electrode 2101 opposing the pixel electrode 2102 together define a single pixel. The size of each pixel electrode 2102, i.e., the pixel size, of the LCD of Example 1 is 70 μm×210 μm. The electrode structure of the LCD of Example 1 is similar to the electrode structure illustrated in FIG. 10, where neither the counter electrode 2101 nor the pixel electrode 2102 has a slit structure (electrode opening).

Note that one of a pair of substrates of the color TFT-LCD on which the pixel electrodes 2102 and the TFTs 2103 are provided will be referred to as a "TFT substrate" (not shown), and the other substrate on which the counter electrode 2101 is provided will be referred to as a "CF (color filter) substrate". The basic structure and operation of color TFT-LCDs are well known in the art, and thus will not be described in detail herein.

The two domains whose orientation axis directions differ from each other by 180° are formed as follows. Note that regions corresponding to the domains 101a and 101b of the LCD 100 illustrated in FIG. 1 are referred to as "region A" and "region B", respectively, in FIG. 14.

First, a horizontal alignment film (not shown) capable of controlling the pretilt angle of the liquid crystal molecules through UV irradiation is applied on one side of the pixel electrodes 2102 and the counter electrode 2101 that is closer to the liquid crystal layer 2101. The horizontal alignment films are subjected to a rubbing process (parallel rubbing) in the direction indicated by arrows 2104 and 2105 in FIG. 14. The liquid crystal molecules on the horizontal alignment type film having been subjected to the rubbing process are aligned with one another with a pretilt angle of about 2° in a direction defined by the rubbing direction.

Then, the horizontal alignment type films are irradiated with UV light in the region A (the lower half of the pixel) of the TFT substrate and in the region B (the upper half of the pixel) of the CF substrate. The UV irradiation changes the pretilt angle of the liquid crystal molecules, which is about 2° through all regions before the UV irradiation, whereby the pretilt angle of the liquid crystal molecules in the irradiated regions (i.e., liquid crystal molecules 2106 on the TFT side in the region A and liquid crystal molecules 2107 on the CF substrate side in the region B) is selectively changed to about 0°. Therefore, the orientation axis direction of the liquid crystal layer in the region A is defined by the orientation direction of liquid crystal molecules 2108 on the CF substrate side (having a pretilt angle of about 2°), whereas the orientation axis direction of the liquid crystal layer in the region B is defined by the orientation direction of liquid crystal molecules 2109 on the TFT side (having a pretilt angle of about 2°). As a result, the orientation axis direction in the region A and that in the region B are as indicated by arrows 2110 and 2111, respectively, in FIG. 14. The arrows 2110 and 2111 in FIG. 14 respectively correspond to the arrows 116a and 116b in FIG. 1. Thus, there is realized a two-domain homogenous alignment type liquid crystal layer in which each pixel is divided into two domains whose orientation axis directions differ from each other by 180°.

The distance between the counter electrode 2101 and the pixel electrodes 2102, i.e., the cell gap (the thickness of the liquid crystal layer), is 4 μm. As the liquid crystal material, a nematic liquid crystal material having a positive dielectric anisotropy Äa of 3.2 and a refractive index anisotropy Än of 0.065 is used.

As the phase difference compensators 102 and 103 illustrated in FIG. 1, uniaxial phase difference films having their slow axes in directions indicated by the arrows 108 and 109, respectively, and a retardation value of 130 nm are used. As the phase difference compensators 104 and 105, biaxial phase difference films having an in-plane retardation value of 92 nm (in directions indicated by the arrows 112 and 113, respectively) and a retardation value in the thickness direction of 96 nm (in directions indicated by the arrows 110 and 111, respectively) are used. G1220DU manufactured by Nitto Denko Corporation is used for the pair of polarizers 106 and 107, which are arranged in a crossed Nicols state.

Figure 15A:
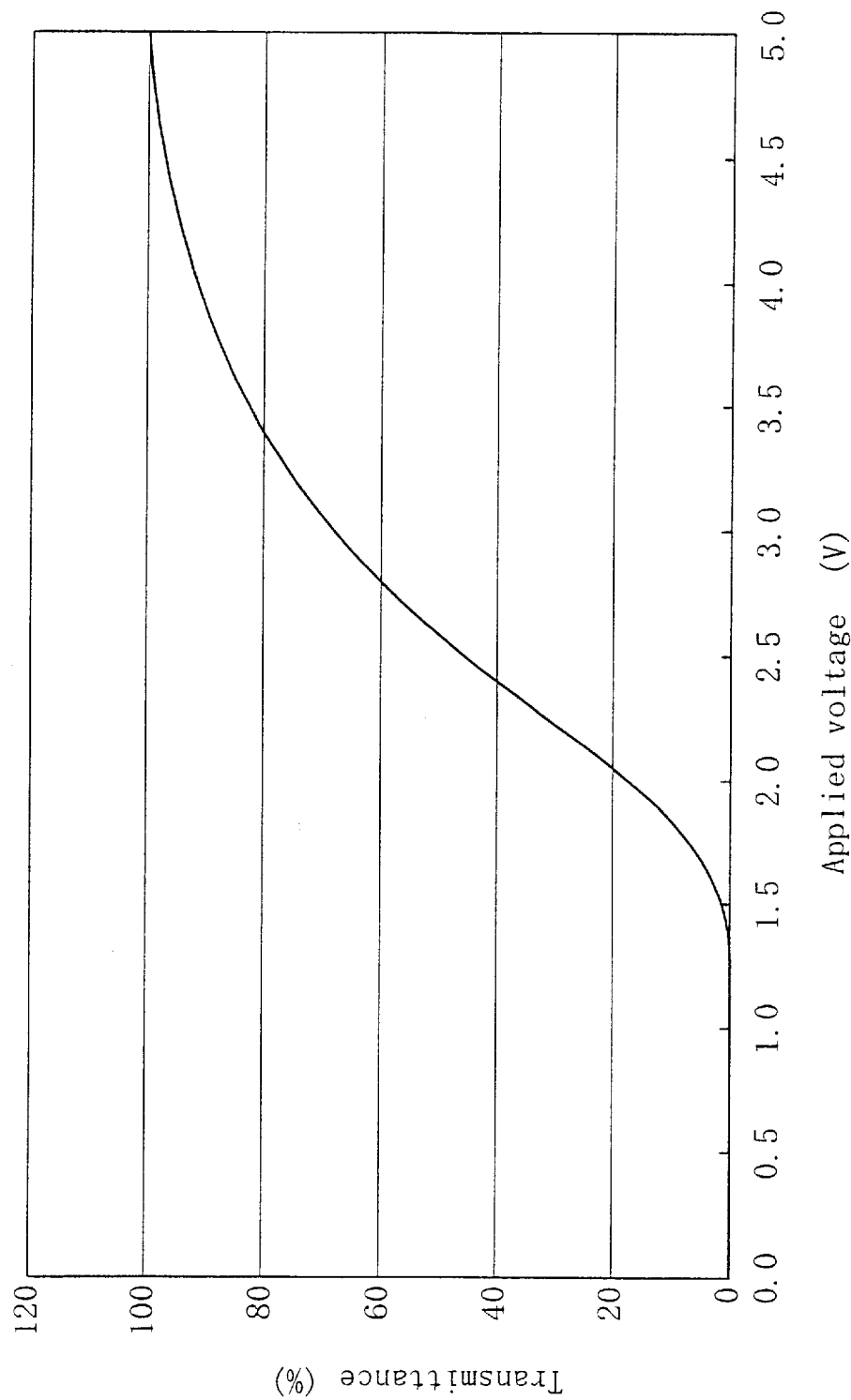
FIG. 15A is a graph illustrating an applied voltage dependence of the transmittance as observed from the normal direction of the LCD of Example 1 of the present invention.

FIG. 15A illustrates an applied voltage dependence of the transmittance (V-T curve) as observed from the normal direction (direction normal to the substrate) of the LCD of Example 1 obtained as described above. The LCD is an NB mode LCD having a very high contrast ratio of about 300:1 in the normal direction.

Figure 15B:
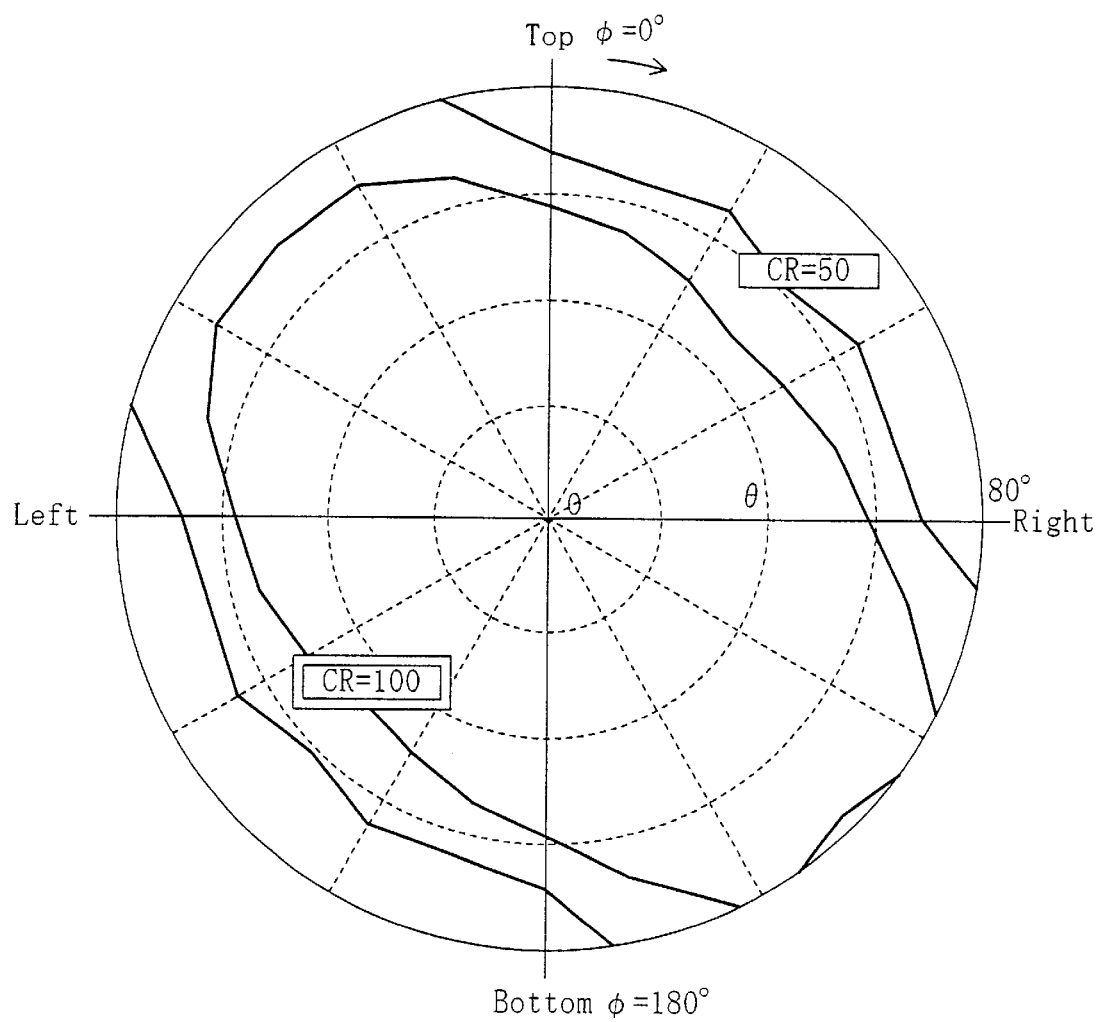
FIG. 15B shows iso-contrast curves (viewing angle characteristics) of the LCD of Example 1.

FIG. 15B illustrates iso-contrast curves (viewing angle characteristics) of the LCD of Example 1, where e denotes the viewing angle while φ denotes the azimuth angle. Note that the rubbing direction corresponds to φ=45°. The LCD of Example 1 has desirable viewing angle characteristics.

Figure 16A:
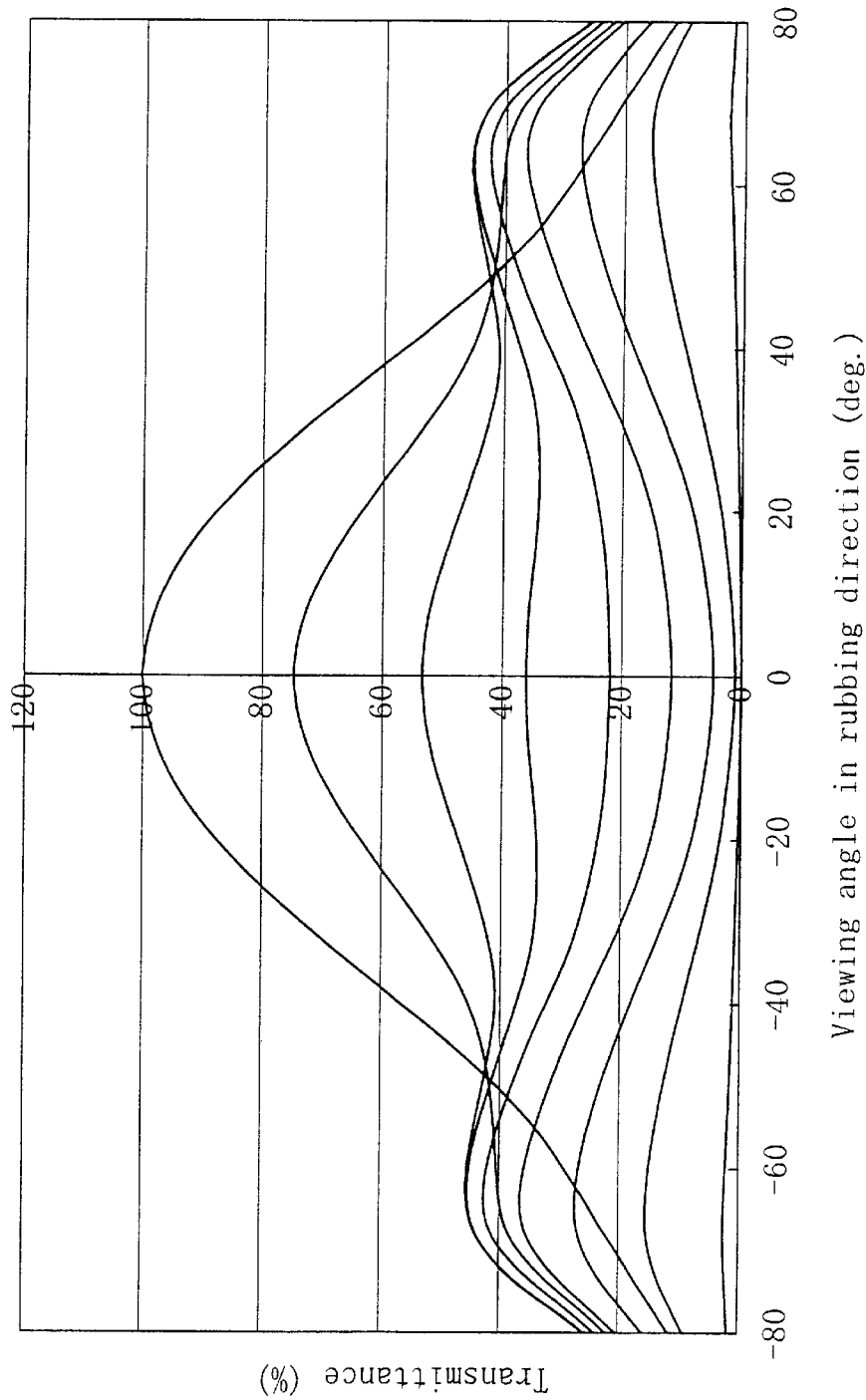
FIG. 16A is a graph illustrating the viewing angle dependence of the brightness in a plane including the rubbing direction of the LCD of Example 1.
Figure 16B:
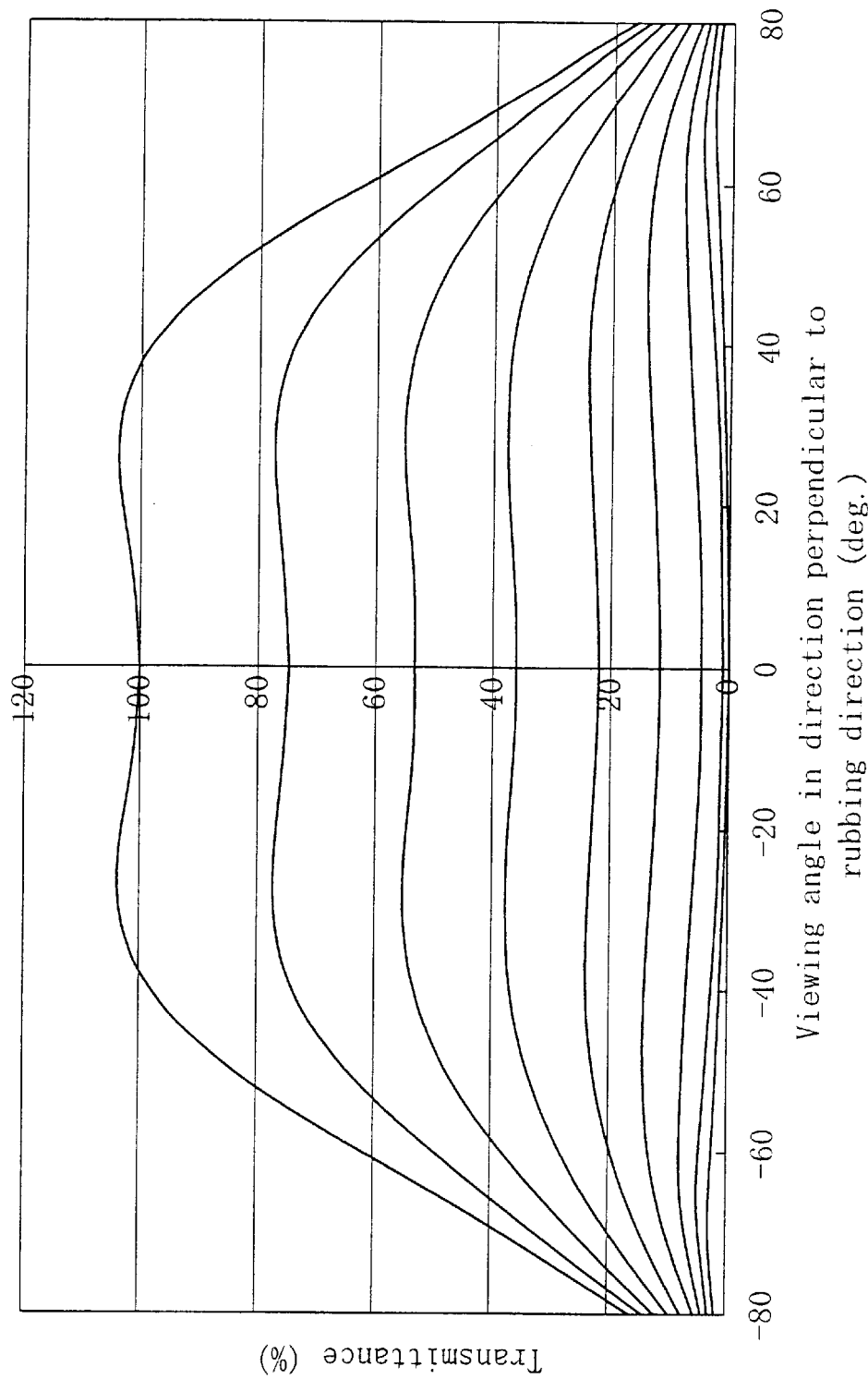
FIG. 16B is a graph illustrating the viewing angle dependence of the brightness in a plane including a direction orthogonal to the rubbing direction of the LCD of Example 1.
Figure 16C:
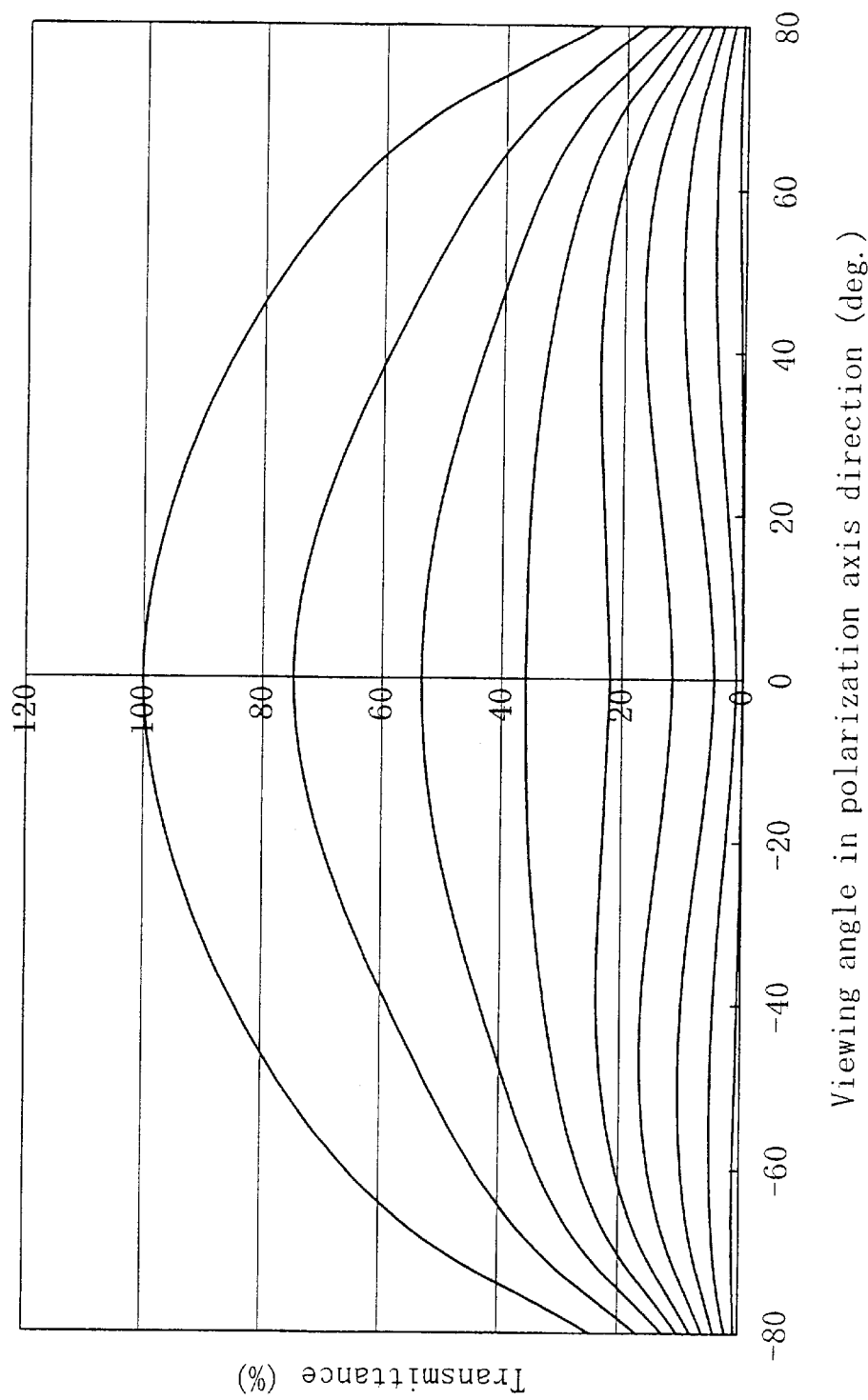
FIG. 16C is a graph illustrating the viewing angle dependence of the brightness in a plane including the polarization axis direction of the LCD of Example 1.

FIG. 16A, FIG. 16B and FIG. 16C each illustrate the viewing angle dependence of the brightness of the LCD of Example 1. FIG. 16A illustrates the viewing angle dependence of the brightness in a plane including the rubbing direction, FIG. 16B illustrates the viewing angle dependence of the brightness in a plane including a direction perpendicular to the rubbing direction, and FIG. 16C illustrates the viewing angle dependence of the brightness in a plane including the polarization axis direction (114 or 115) of the polarizer 106 or 107.

As can be seen from the figures, the viewing angle dependence of the brightness is symmetric about the normal direction for any azimuth angle. It can also be seen that the change in brightness as the viewing angle is changed in a plane including the rubbing direction, as illustrated in FIG. 16A, is greater than those illustrated in FIG. 16B and FIG. 16C. Moreover, as can be seen from FIG. 16A, when the viewing angle is changed in a plane including the rubbing direction, a gray level inversion occurs as the viewing angle exceeds about ±55°.

As described above, the LCD only having the first configuration provides a desirable black display in the normal direction and has a very high contrast ratio. Moreover, the viewing angle dependence of the brightness is made symmetric by the employment of orientation division. However, a gray level inversion occurs as the viewing angle is changed in a plane including the rubbing direction.

Example 2

Figure 17:
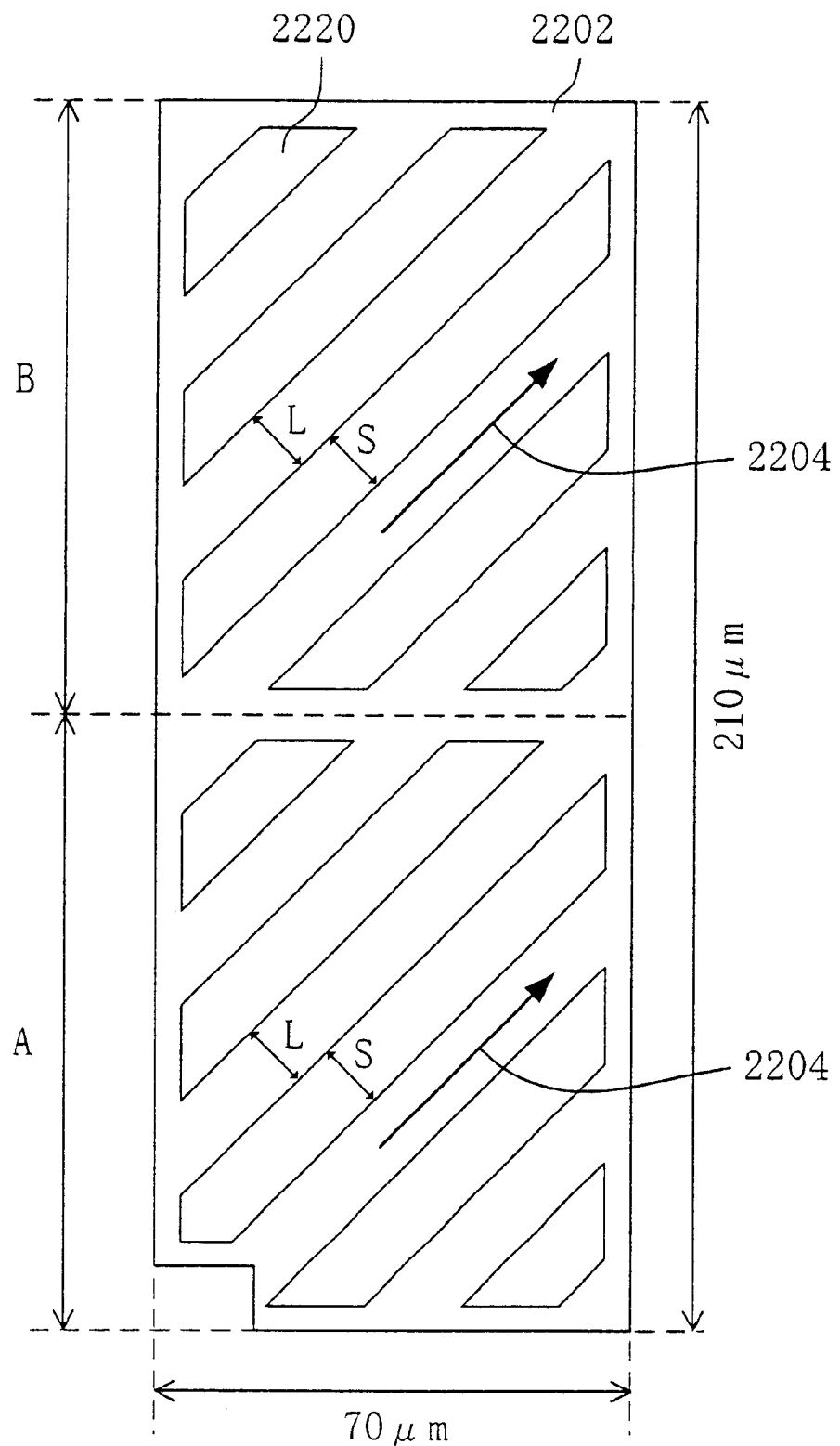
FIG. 17 is a diagram schematically illustrating a structure of a pixel electrode of an LCD of Example 2.

The second configuration is applied to the LCD of Example 1. Specifically, a slit structure as illustrated in FIG. 17 is employed with the pixel electrode 2102 illustrated in FIG. 14 to obtain an electrode structure similar to the electrode structure illustrated in FIG. 11A. The LCD of Example 2 is structurally the same as that of Example 1 except that the pixel electrode 2102 illustrated in FIG. 14 is changed to a pixel electrode 2202 of FIG. 17.

Specifically, as illustrated in FIG. 17, slit-shaped openings 2220 whose long side is parallel to a rubbing direction 2204 are provided in the pixel electrode 2202 of 70 μm×210 μm. A width S of each opening 2220 is 10 μm, and an interval L between adjacent openings 2220 is 10 μm. It should be noted that the openings 2220 are not provided around the periphery and in a central portion of the pixel electrode 2202 in order to ensure electric conduction through the pixel electrode 2202 (i.e., so that the solid portions of the pixel electrode 2202 have an equal potential).

Figure 18A:
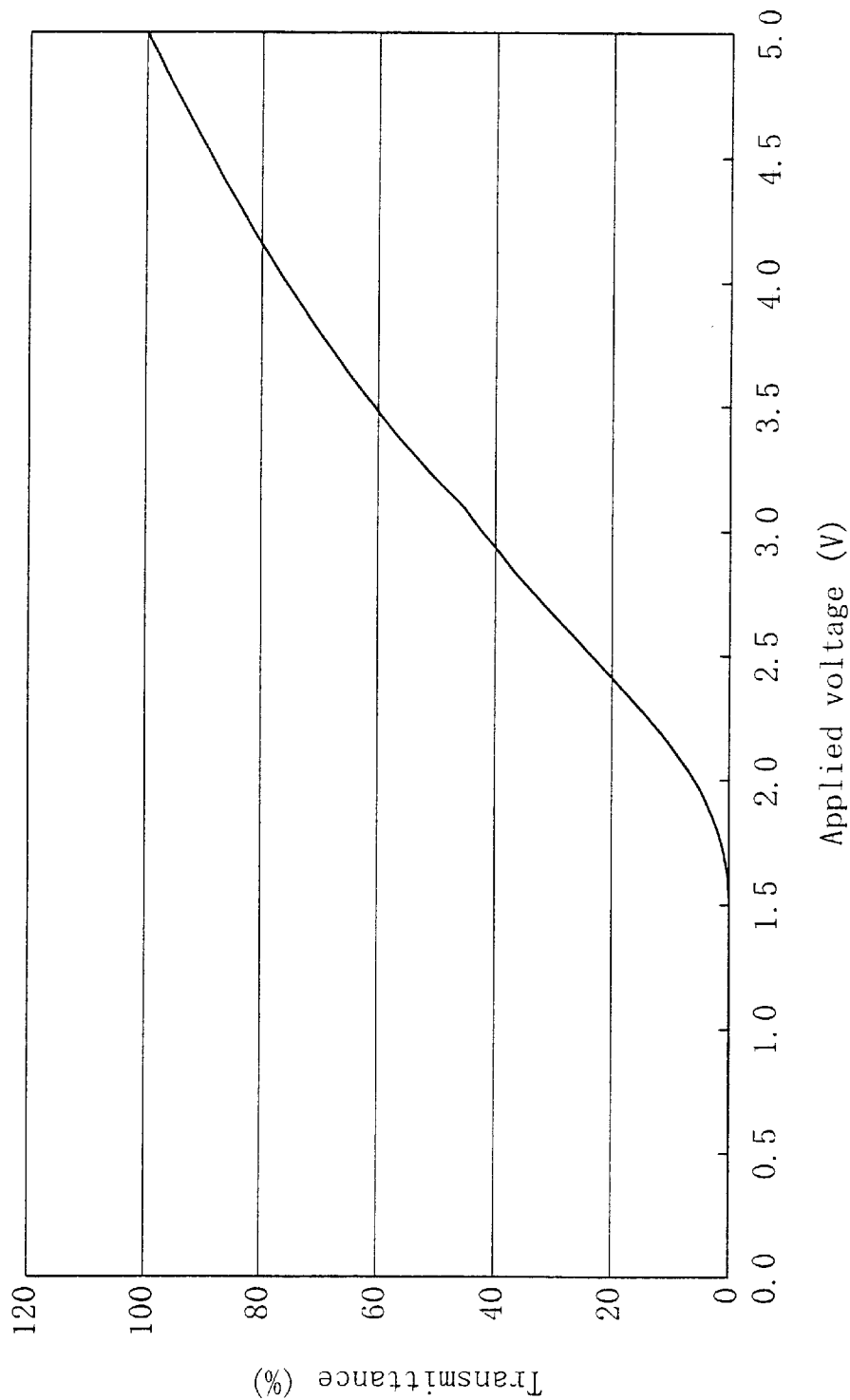
FIG. 18A is a graph illustrating an applied voltage dependence of the transmittance as observed from the normal direction of the LCD of Example 2 of the present invention.

FIG. 18A illustrates an applied voltage dependence of the transmittance (V-T curve) as observed from the normal direction (direction normal to the substrate) of the LCD of Example 2. The LCD of Example 2 also has a very high contrast ratio of about 300:1 in the normal direction.

Figure 18B:
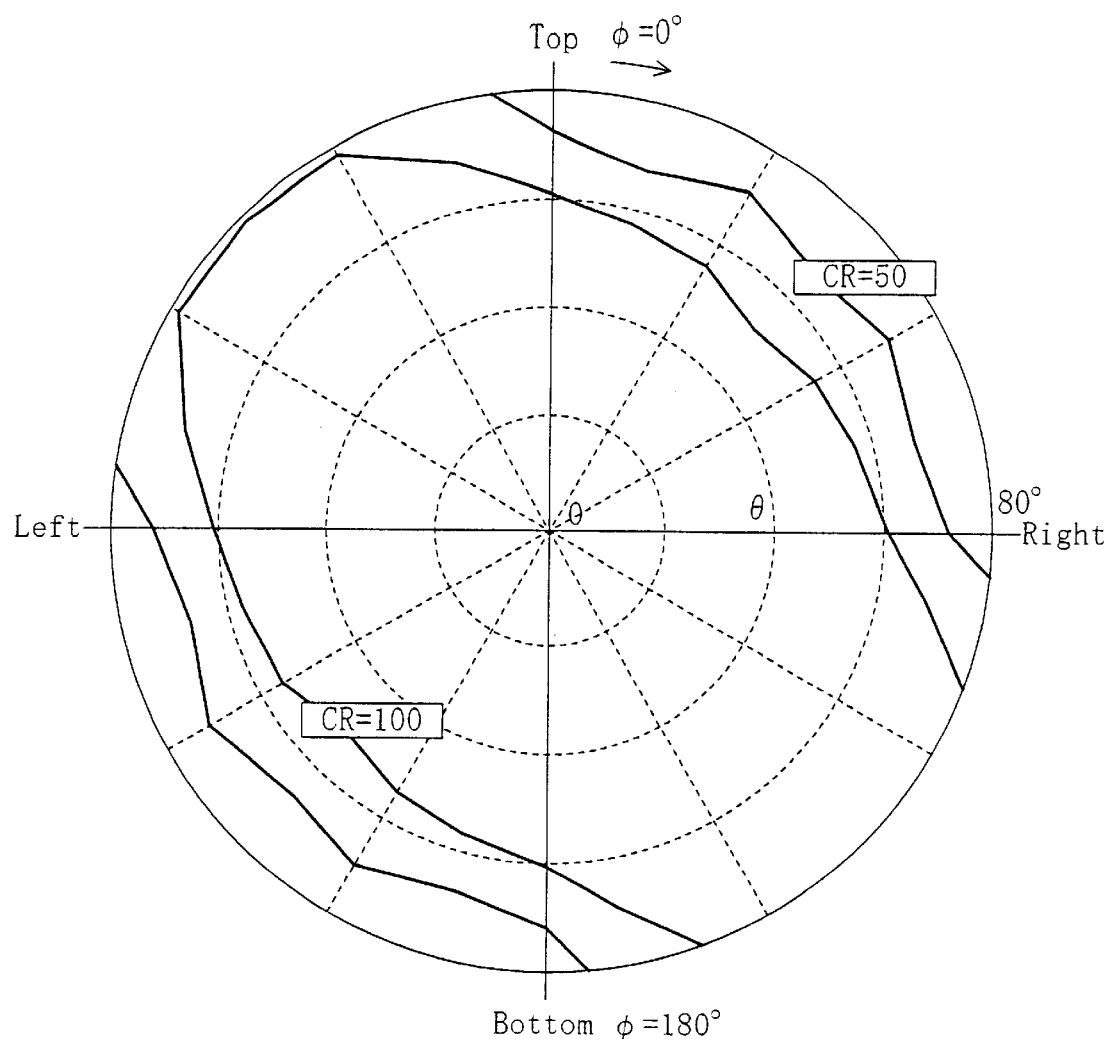
FIG. 18B shows iso-contrast curves (viewing angle characteristics) of the LCD of Example 2.

FIG. 18B illustrates iso-contrast curves (viewing angle characteristics) of the LCD of Example 2. As is apparent from a comparison between FIG. 18B of Example 2 and FIG. 15B of Example 1, the LCD of Example 2 has better viewing angle characteristics (has a wider area where the contrast ratio is high) than those of the LCD of Example 1.

Figure 19A:
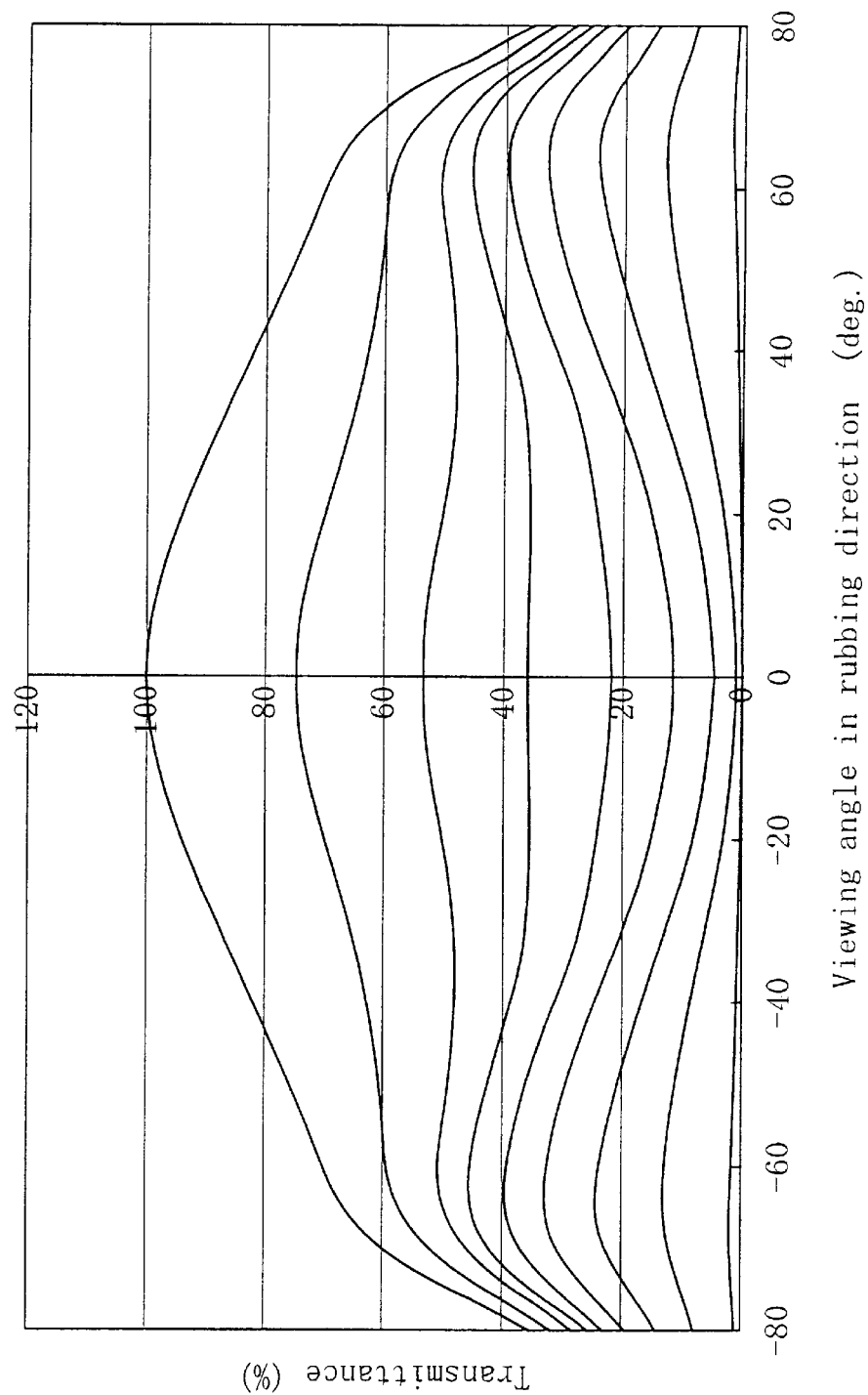
FIG. 19A is a graph illustrating a viewing angle dependence of the brightness in a plane including the rubbing direction of the LCD of Example 2.
Figure 19B:
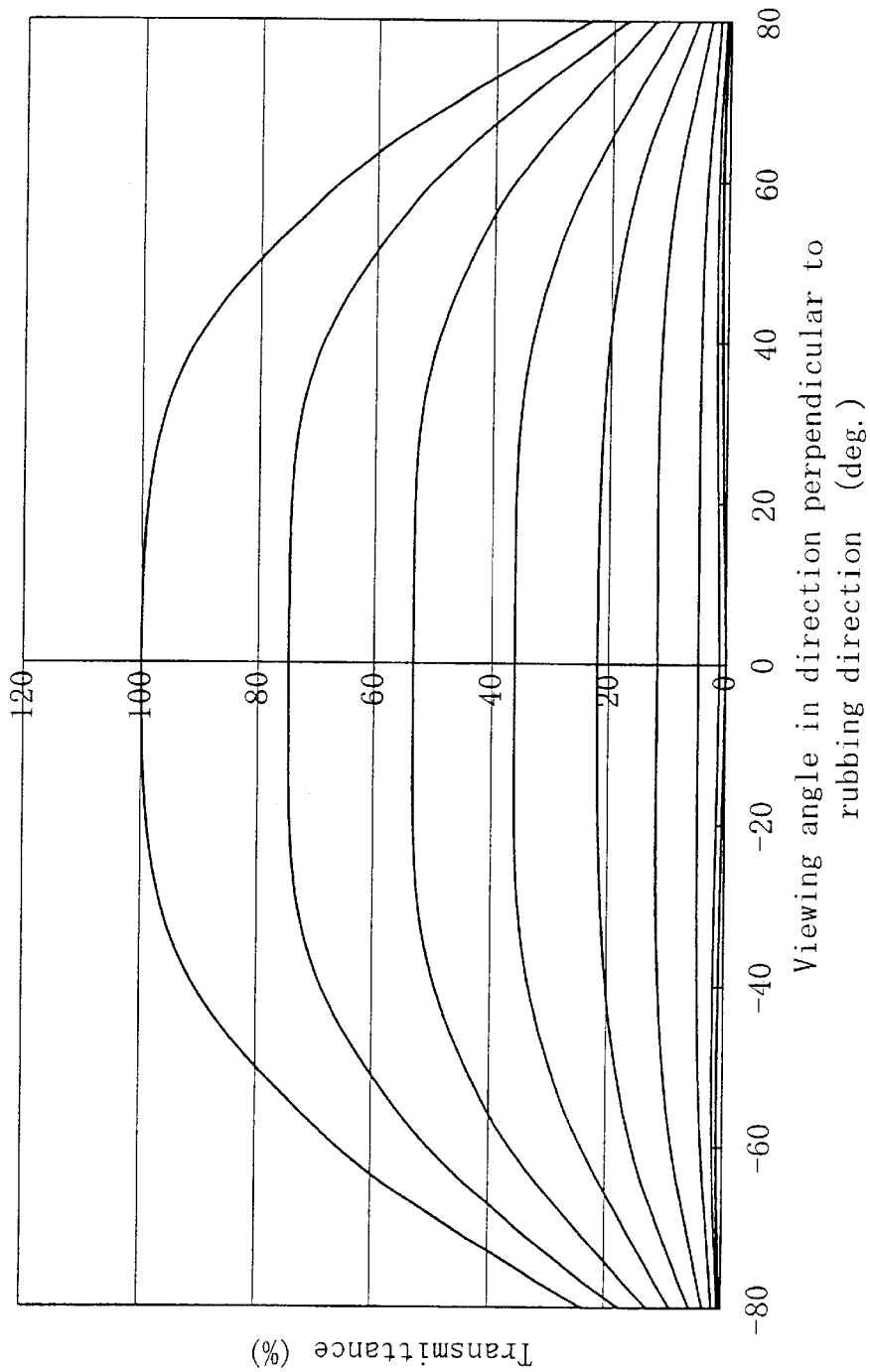
FIG. 19B is a graph illustrating the viewing angle dependence of the brightness in a plane including a direction orthogonal to the rubbing direction of the LCD of Example 2.
Figure 19C:
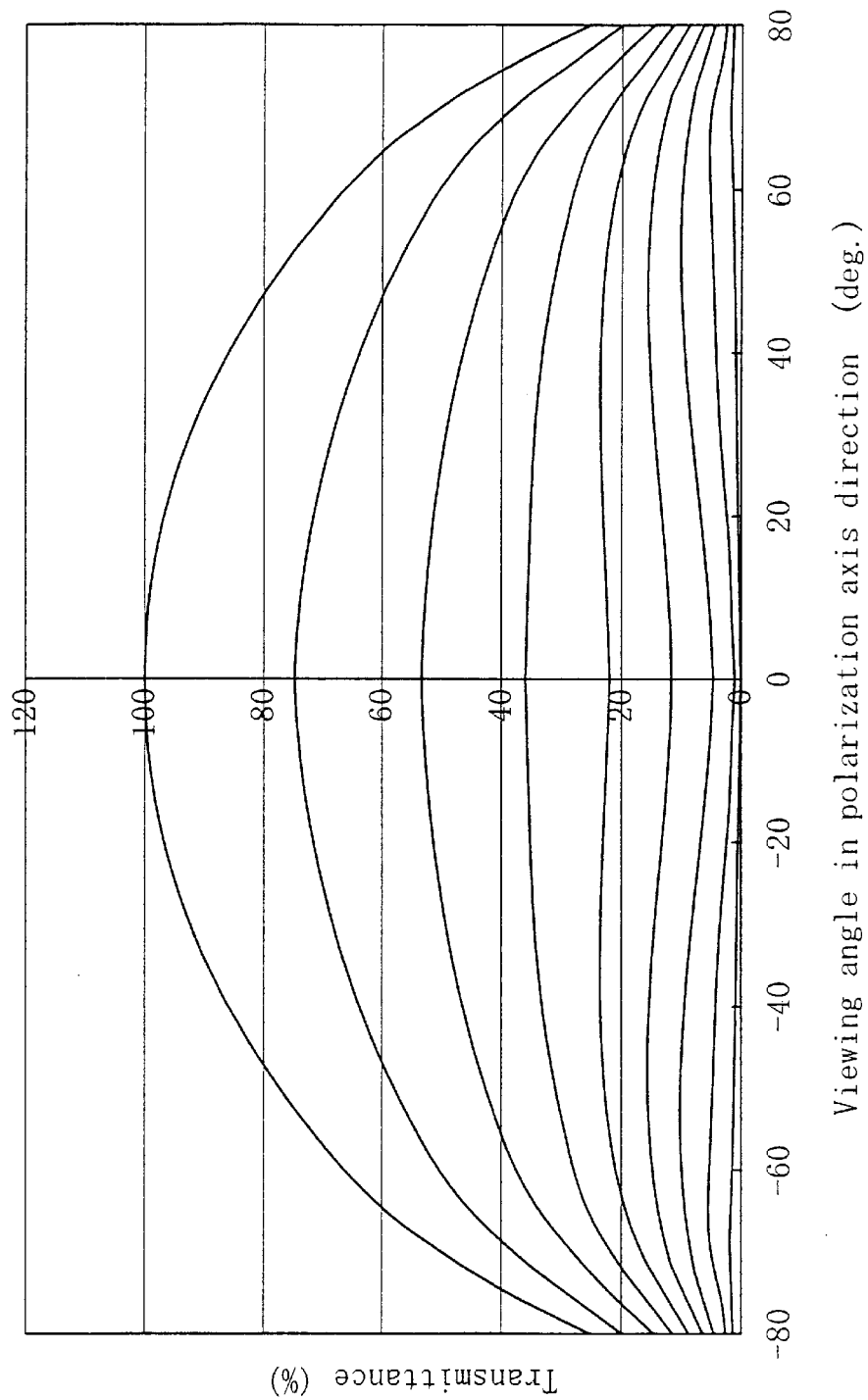
FIG. 19C is a graph illustrating the viewing angle dependence of the brightness in a plane including the polarization axis direction of the LCD of Example 2.

FIG. 19A, FIG. 19B and FIG. 19C each illustrate a viewing angle dependence of the brightness of the LCD of Example 2. FIG. 19A illustrates the viewing angle dependence of the brightness in a plane including the rubbing direction, FIG. 19B illustrates the viewing angle dependence of the brightness in a plane including a direction perpendicular to the rubbing direction, and FIG. 19C illustrates the viewing angle dependence of the brightness in a plane including the polarization axis direction of the polarizer.

As can be seen from a comparison of FIG. 19A, FIG. 19B and FIG. 19C respectively with FIG. 16A, FIG. 16B and FIG. 16C, the change in brightness of the LCD of Example 2 is smaller than that of the LCD of Example 1 in any azimuth angle direction. Particularly, in the change in brightness as the viewing angle is changed in a plane including the rubbing direction, as illustrated in FIG. 19A, there is no gray level inversion as seen in FIG. 16A.

Thus, the LCD of the present invention has the second configuration together with the first configuration, thereby providing a desirable black display, a very high contrast ratio, and a reduced viewing angle dependence of the brightness.

Comparative Example 1

Comparative Example 1 is a conventional NW mode, TN type LCD. A nematic liquid crystal material having a positive dielectric anisotropy $\Delta\varepsilon$ of 3.6 and a refractive index anisotropy $\Delta n$ of 0.082 is used as the liquid crystal material, and the thickness of the liquid crystal layer is 4 μm.

Figure 20:
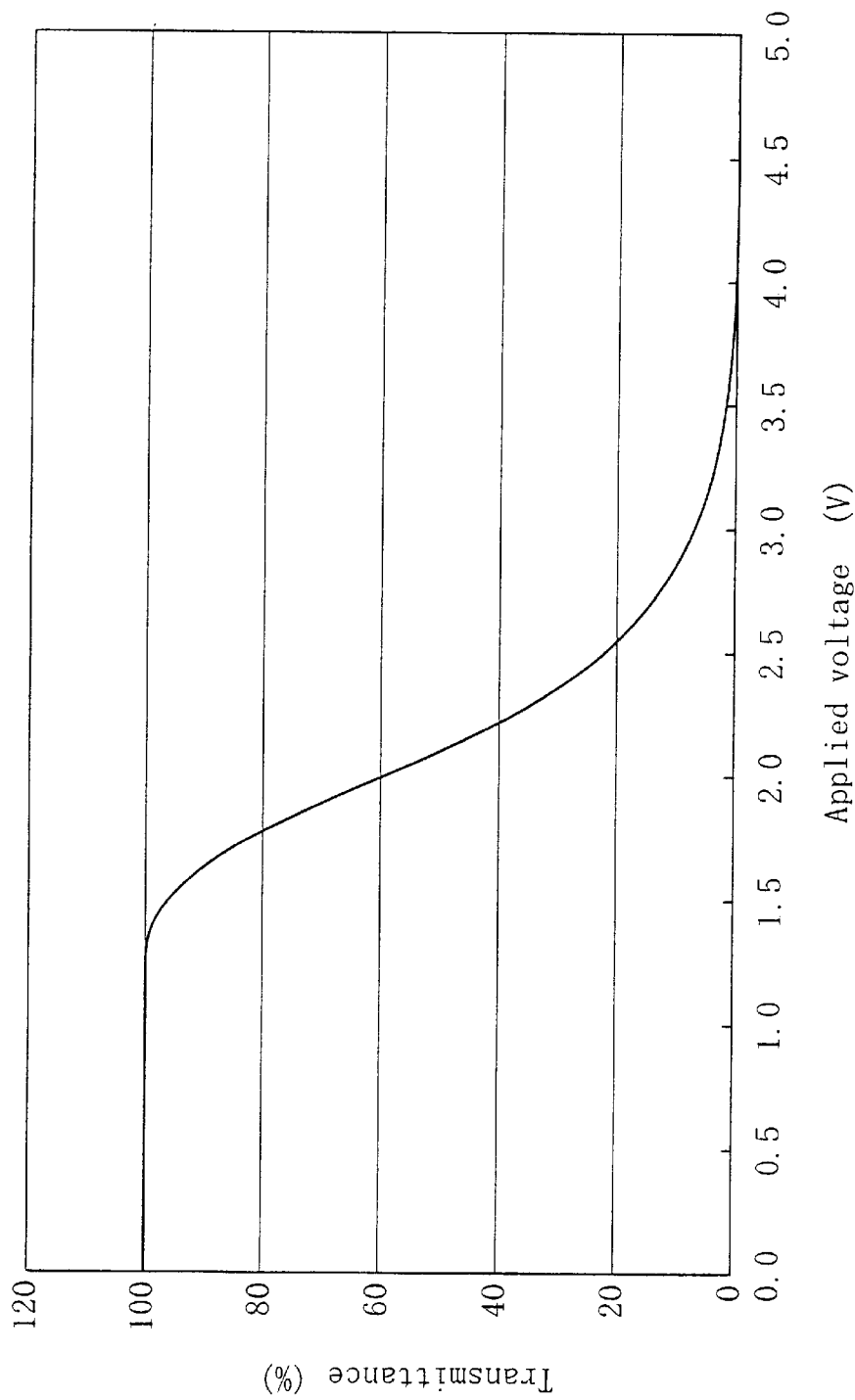
FIG. 20 is a graph illustrating an applied voltage dependence of the transmittance as observed from the normal direction of an LCD of Comparative Example 1.

FIG. 20 illustrates an applied voltage dependence of the transmittance (V-T curve) as observed from the normal direction of the LCD of Comparative Example 1. The LCD is an NW mode LCD, and has a very high contrast ratio of about 200:1 in the normal direction.

Figure 21:
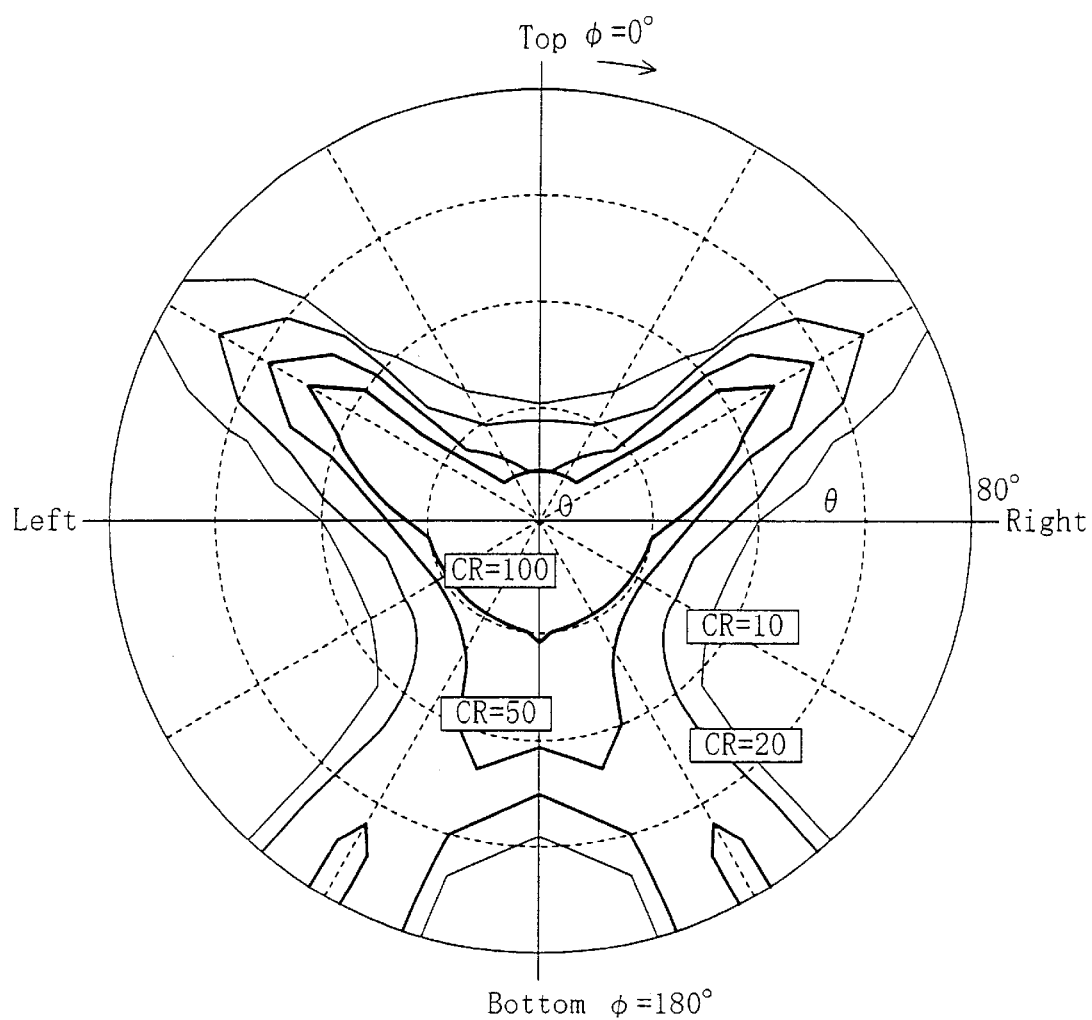
FIG. 21 shows iso-contrast curves (viewing angle characteristics) of the LCD of Comparative Example 1.

However, as can be seen from iso-contrast curves (viewing angle characteristics) of the LCD of Comparative Example 1 illustrated in FIG. 21, the LCD of Comparative Example 1 has a narrow viewing angle as compared to that of the LCD of the present invention illustrated in FIG. 18B. Particularly, when the viewing angle (è) is increased past 20° in the upward direction (φ=0°), the contrast ratio decreases to be 10 or less, whereby the display quality deteriorates to such an extent that the displayed image cannot be well recognized. Note that the azimuth angles of the polarization axes of the upper and lower polarizers are φ=135° and φ=45°, respectively; the rubbing directions of the upper and lower substrates are φ=135° and φ=45°, respectively; and the orientation axis direction, which is the orientation direction of the liquid crystal molecules near the center of the liquid crystal layer, is φ=180°.

Figure 22A:
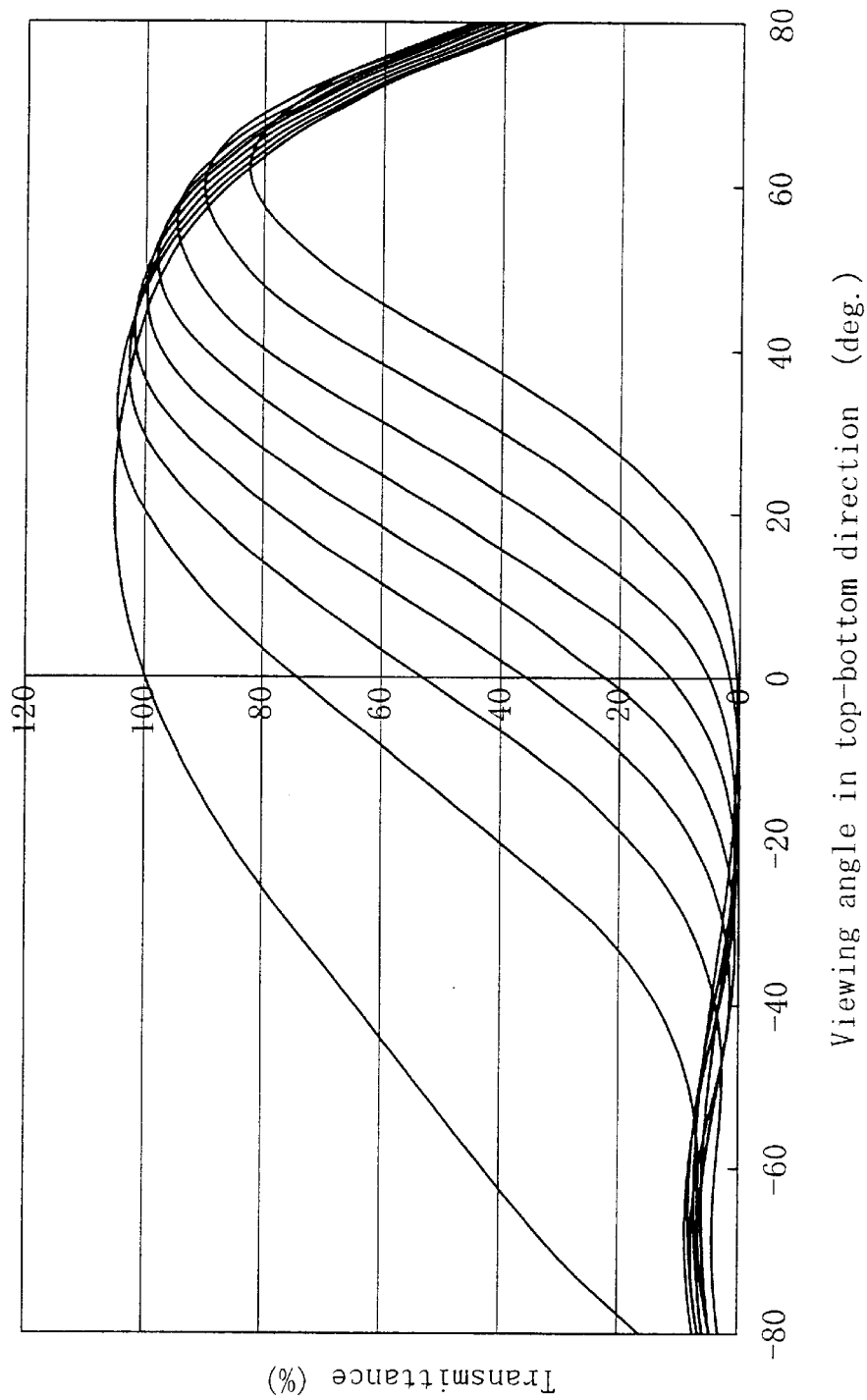
FIG. 22A is a graph illustrating a viewing angle dependence of the brightness in the top-bottom direction of the LCD of Comparative Example 1.
Figure 22B:
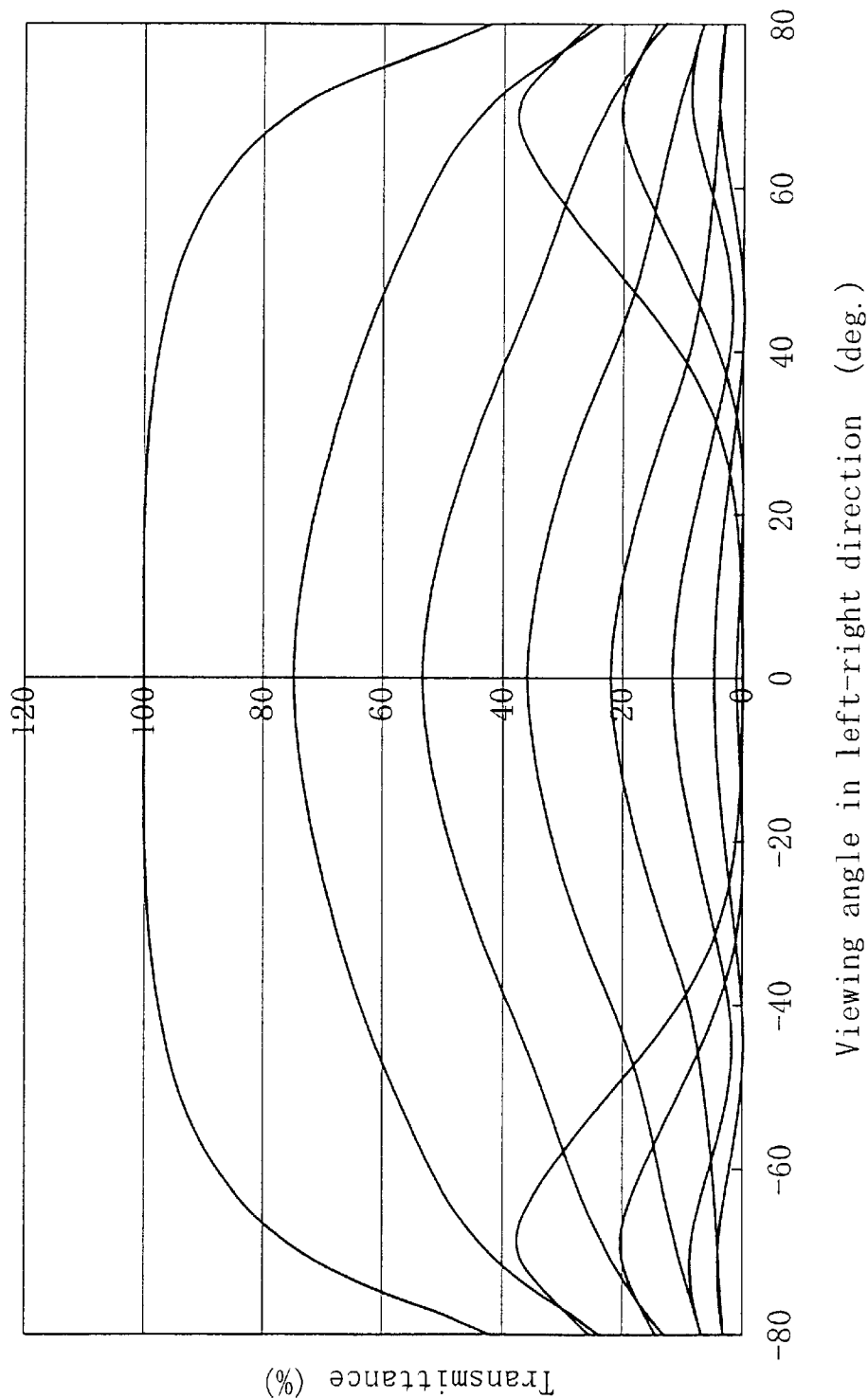
FIG. 22B is a graph illustrating a viewing angle dependence of the brightness in the left-right direction of the LCD of Comparative Example 1.
Figure 22C:
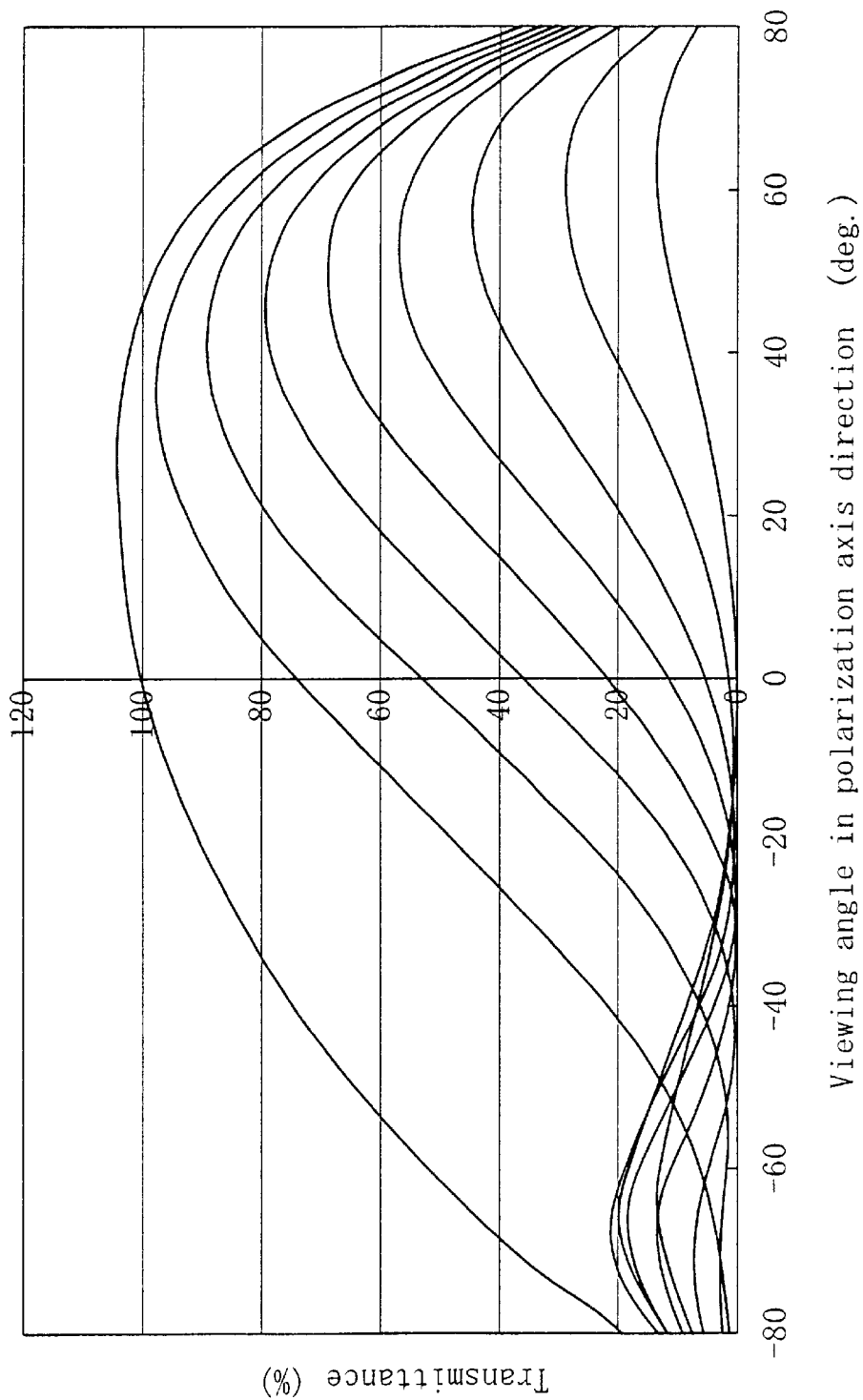
FIG. 22C is a graph illustrating a viewing angle dependence of the brightness in the polarization axis direction of the LCD of Comparative Example 1.

FIG. 22A, FIG. 22B and FIG. 22C each illustrate a viewing angle dependence of the brightness of the LCD of Comparative Example 1. FIG. 22A illustrates the viewing angle dependence of the brightness in the top-bottom direction, FIG. 22B illustrates the viewing angle dependence of the brightness in the left-right direction, and FIG. 22C illustrates the viewing angle dependence of the brightness in a plane including the polarization axis direction.

As illustrated in FIG. 22A and FIG. 22C, the change in brightness in the top-bottom direction or in a plane including the polarization axis are substantial and asymmetric. Moreover, in the left-right direction, a gray level inversion occurs as the viewing angle exceeds about ±30, as illustrated in FIG. 22B. Thus, in a conventional TN type LCD, both the contrast ratio and the brightness greatly depend on the viewing angle.

Comparative Example 2

Figure 23:
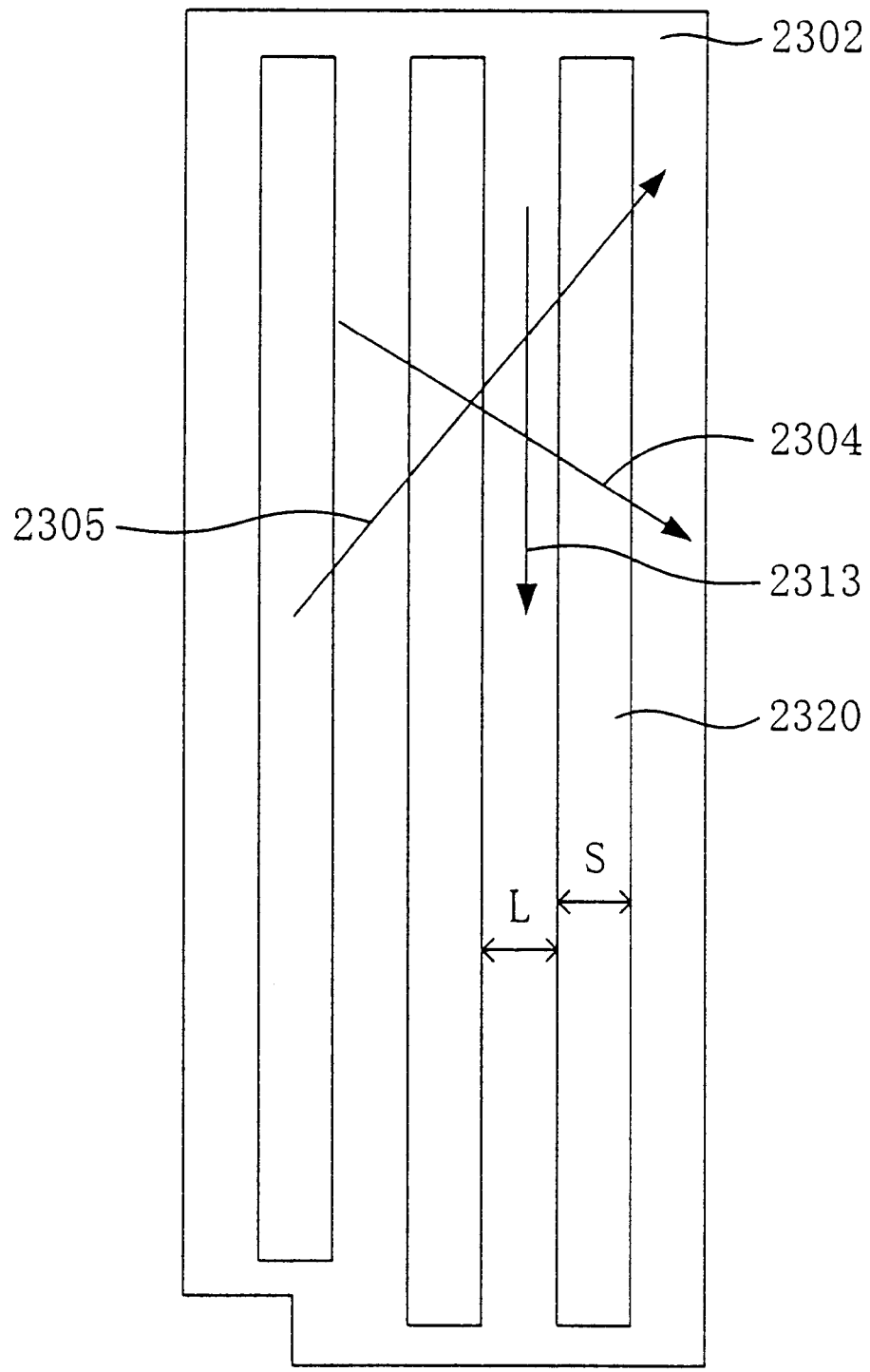
FIG. 23 is a diagram schematically illustrating a structure of a pixel electrode of an LCD of Comparative Example 2.

In Comparative Example 2, an electrode structure having slit-shaped openings (see FIG. 11A) is applied to the conventional NW mode, TN type LCD of Comparative Example 1. Specifically, slit-shaped openings 2320 are provided in a pixel electrode 2302 of 70 $\mu$m×210 $\mu$m, as illustrated in FIG. 23. A width S of each opening 2320 is 10 $\mu$m, and an interval L between adjacent openings 2320 is 10 $\mu$m. Note that the rubbing direction of the pixel electrode 2302 is as indicated by an arrow 2304 ($\phi$=135°); the rubbing direction of the counter electrode (not shown) is as indicated by an arrow 2305 ($\phi$=45°); and the orientation axis direction, which is the orientation direction of the liquid crystal molecules near the center of the liquid crystal layer, is as indicated by an arrow 2313 ($\phi$=180°).

Figure 24A:
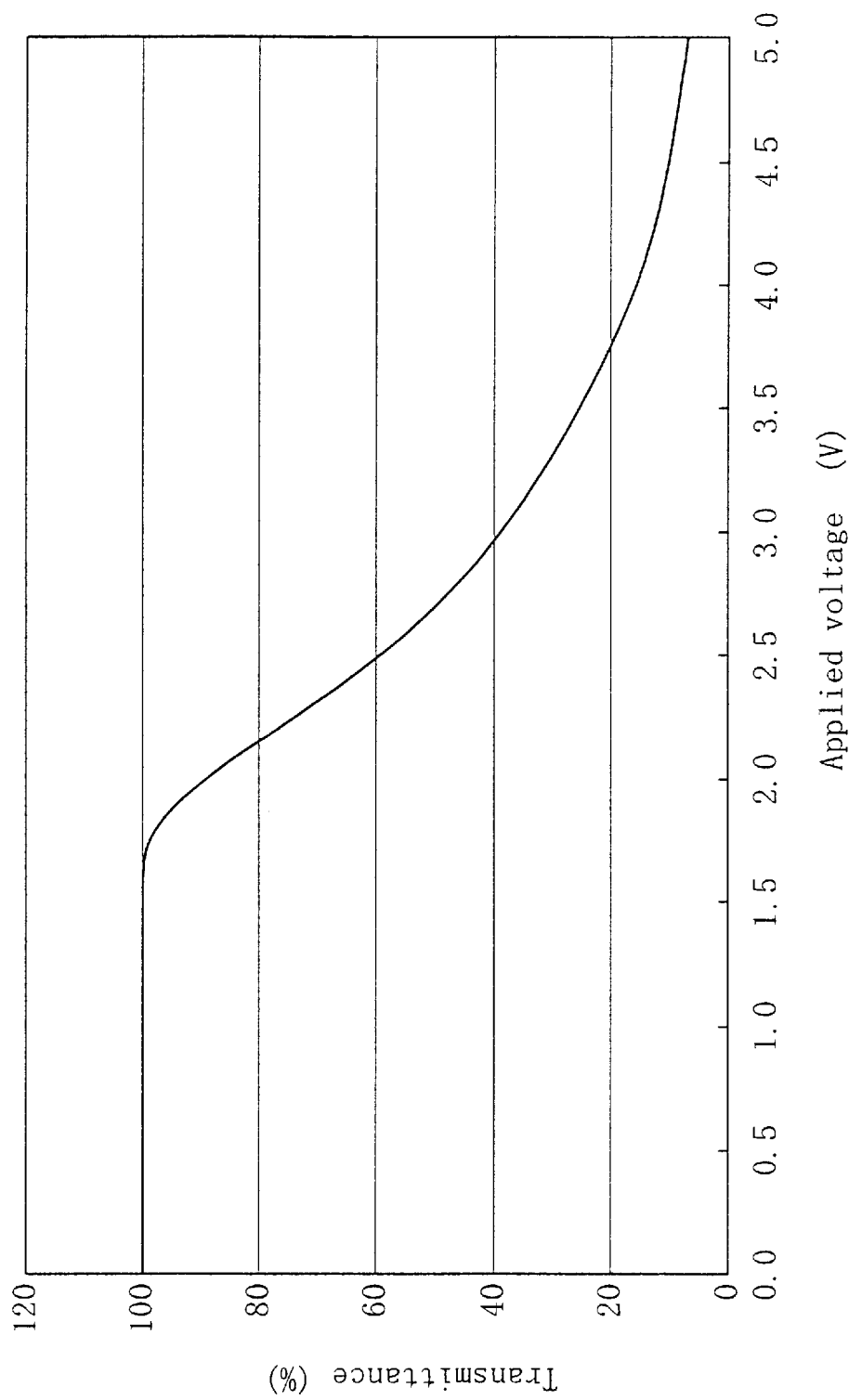
FIG. 24A is a graph illustrating an applied voltage dependence of the transmittance as observed from the normal direction of an LCD of Comparative Example 2.

FIG. 24A illustrates an applied voltage dependence of the transmittance (V-T curve) as observed from the normal direction of the LCD of Comparative Example 2. The LCD is an NW mode LCD, and has a very low contrast ratio of about 10:1 in the normal direction.

Moreover, as can be seen from iso-contrast curves (viewing angle characteristics) of the LCD of Comparative Example 2 illustrated in FIG. 24B, the viewing angle range in which the contrast ratio is 10 or more is narrower than that of Comparative Example 1, though the symmetry of the viewing angle characteristics is slightly improved from that of Comparative Example 1.

Figure 25A:
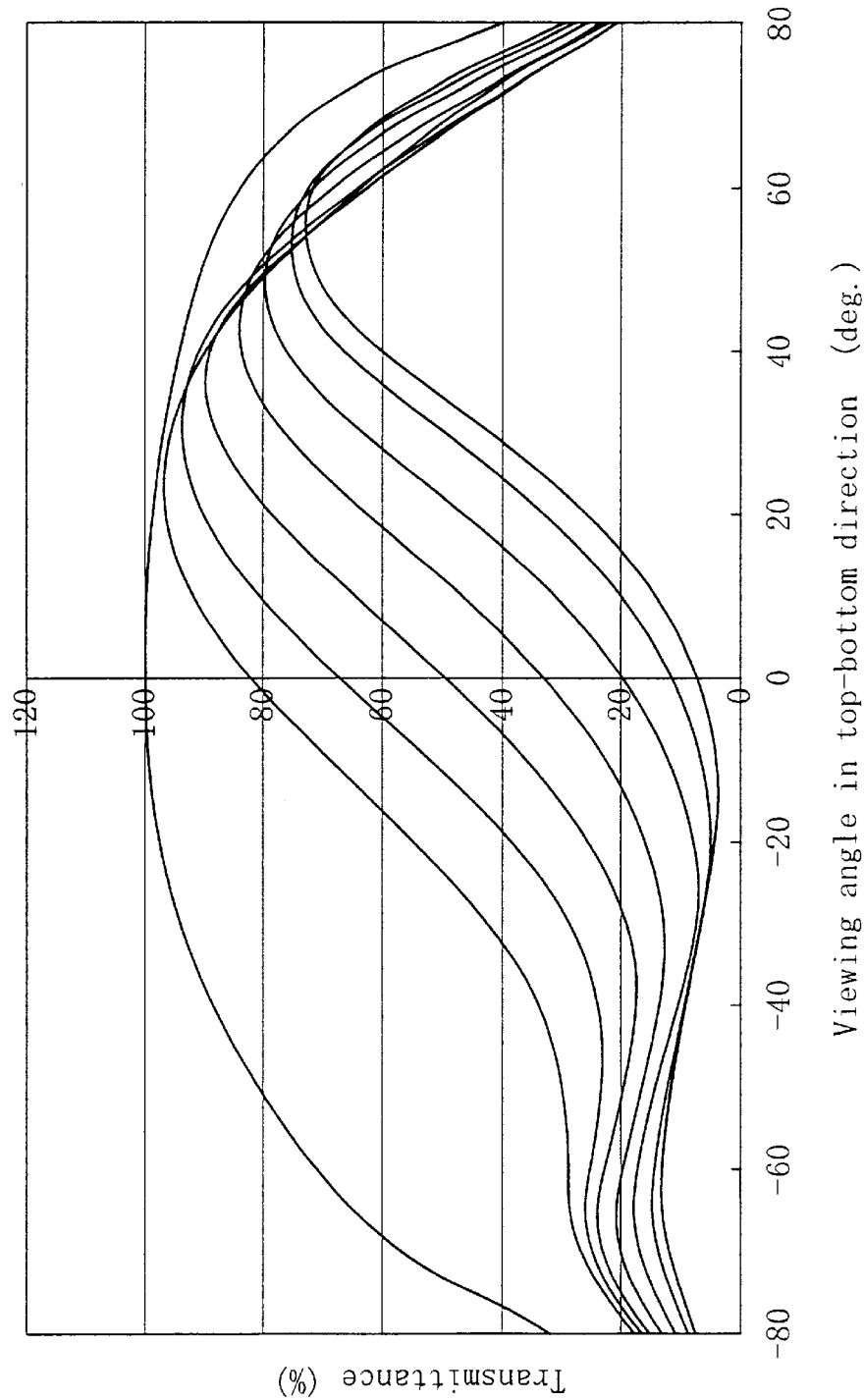
FIG. 25A is a graph illustrating a viewing angle dependence of the brightness in the top-bottom direction of the LCD of Comparative Example 2.
Figure 25B:
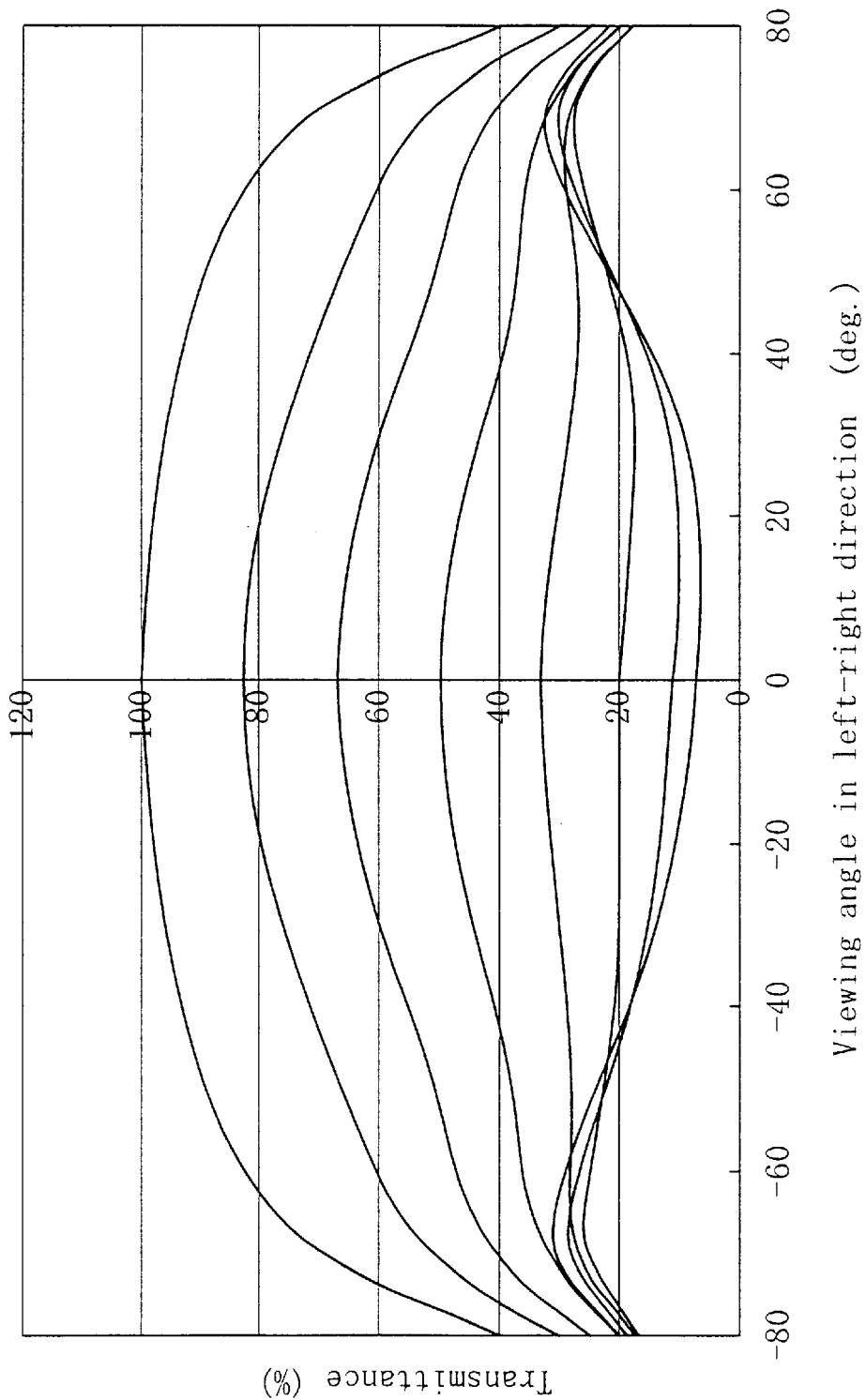
FIG. 25B is a graph illustrating a viewing angle dependence of the brightness in the left-right direction of the LCD of Comparative Example 2.

Moreover, FIG. 25A, FIG. 25B and FIG. 25C each illustrate a viewing angle dependence of the brightness of the LCD of Comparative Example 2. FIG. 25A illustrates the viewing angle dependence of the brightness in the top-bottom direction, FIG. 25B illustrates the viewing angle dependence of the brightness in the left-right direction, and FIG. 25C illustrates the viewing angle dependence of the brightness in a plane including the polarization axis direction. As can be seen from a comparison of these figures respectively with FIG. 22A, FIG. 22B and FIG. 22C for the LCD of Comparative Example 1, the viewing angle dependence of the brightness is slightly improved by employing an electrode structure having slit-shaped openings.

However, as is apparent from FIG. 24A and FIG. 24B, the contrast ratio (including the contrast ratio in the normal direction) is significantly lowered, and a practical level of display quality cannot be obtained.

As can be seen from the above, the effect of the present invention is obtained by combining the second configuration with the first configuration (particularly the NB mode).

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device, comprising:
a liquid crystal cell having a pair of substrates, a horizontal orientation liquid crystal layer provided between the pair of substrates and including liquid crystal molecules having a positive dielectric anisotropy, and a plurality of pixels each being defined by a pair of electrodes opposing each other via the liquid crystal layer therebetween; and
a pair of polarizers and at least one phase difference compensator provided outside the liquid crystal cell, wherein:
the pair of polarizers and the at least one phase difference compensator are arranged so that a display brightness is lower in an absence of an electric field applied across the liquid crystal layer than in a presence of an electric field applied across the liquid crystal layer; and
the pair of electrodes produce a transverse electric field component parallel to a plane of the liquid crystal layer in a presence of an applied voltage therebetween, and an orientation axis direction, which is defined by an azimuth angle of an orientation direction of liquid crystal molecules near a center of the liquid crystal layer in a thickness direction thereof, is changed by the transverse electric field component.

2. The liquid crystal display device of claim 1, wherein the pair of polarizers are arranged so that polarization axes thereof are orthogonal to each other.

3. The liquid crystal display device of claim 1, wherein the liquid crystal layer is a homogenous alignment type liquid crystal layer.

4. The liquid crystal display device of claim 3, wherein an azimuth angle direction of an orientation direction of the liquid crystal molecules of the liquid crystal layer in a presence of an applied voltage varies depending on a position in a thickness direction of the liquid crystal layer.

5. The liquid crystal display device of claim 1, wherein the liquid crystal layer includes, in each of the plurality of pixels, a plurality of domains whose orientation axis directions differ from one other.

6. The liquid crystal display device of claim 5, wherein the plurality of domains include domains whose orientation axis directions differ from each other by 180°.

7. The liquid crystal display device of claim 5, wherein the liquid crystal layer includes, in each of the plurality of pixels, a plurality of regions whose orientation axis directions change in different directions in a presence of an applied voltage, and the plurality of regions have an equal area and are arranged symmetrically.

8. The liquid crystal display device of claim 1, wherein the pair of electrodes produce transverse electric field components of different directions in a presence of an applied voltage.

9. The liquid crystal display device of claim 8, wherein the transverse electric field components of different directions include transverse electric field components of directions differing from each other by 180°.

10. The liquid crystal display device of claim 1,
wherein a direction of the transverse electric field component produced by the pair of electrodes is at an angle of 60° to 90° with respect to the orientation axis direction of the liquid crystal layer in an absence of an applied voltage.

11. The liquid crystal display device of claim 1,
wherein at least one of the pair of electrodes is a conductive layer including openings therein, thereby producing the transverse electric field component.

12. The liquid crystal display device of claim 1, further comprising another phase difference compensator for compensating for a retardation of the liquid crystal layer in an absence of an applied voltage for light incident from a direction inclined from a direction normal to a plane of the liquid crystal layer.

13. The liquid crystal display of claim 1, wherein the phase difference compensators compensate for a refractive index anisotropy of the liquid crystal molecules aligned generally parallel to the pair of substrate planes in the absence of an applied voltage.

14. The liquid crystal display of claim 1, wherein the liquid crystal molecules are aligned generally parallel to the pair of substrate planes in the absence of an applied voltage, and rise relative to the pair of substrate planes in presence of an applied voltage.

15. The liquid crystal display of claim 1, wherein the electrodes have slits defined therein for producing the transverse electric field.

* * * * *

UNITED STATES PATENT AND TRADEMARK OFFICE
CERTIFICATE OF CORRECTION

PATENT NO.   : 6,717,645 B2
DATED        : April 6, 2004
INVENTOR(S)  : Shimoshikiryou et al.

It is certified that error appears in the above-identified patent and that said Letters Patent is hereby corrected as shown below:

Title page,
Item [54], Title, "ELECTRODES(S)" should be -- ELECTRODE(S) --.
Item [75], the correct city for the following inventors should read:
"Fumikazu Shimoshikiryou"; -- Mie -- (JP)
"Keizo Watanabe"; -- Mie -- (JP)
"Keisuke Yoshida" -- Nara -- (JP)
Item [56], References Cited, U.S. PATENT DOCUMENTS, please add:
-- 5,872,611  2/1999  Hirata et al. --
FOREIGN PATENT DOCUMENTS, please add:
-- JP 6-75116 A  3/1994
   JP 10-307291 A  11/1998
   JP 11-305217 A  11/1999 --

Signed and Sealed this

Thirteenth Day of July, 2004

JON W. DUDAS
*Acting Director of the United States Patent and Trademark Office*